(12) United States Patent
Olivares et al.

(10) Patent No.: US 12,555,671 B2
(45) Date of Patent: Feb. 17, 2026

(54) METHOD AND APPARATUS FOR CLINICAL DATA INTEGRATION

(71) Applicant: Efferent LLC, The Woodlands, TX (US)

(72) Inventors: Jaime Olivares, The Woodlands, TX (US); Kress Stein, The Woodlands, TX (US); Brian Pari, The Woodlands, TX (US)

(73) Assignee: EFFERENT LLC, The Woodlands, TX (US)

( * ) Notice: Subject to any disclaimer, the term of this patent is extended or adjusted under 35 U.S.C. 154(b) by 145 days.

(21) Appl. No.: 17/991,520

(22) Filed: Nov. 21, 2022

(65) Prior Publication Data

US 2023/0162837 A1 May 25, 2023

Related U.S. Application Data

(60) Provisional application No. 63/282,919, filed on Nov. 24, 2021.

(51) Int. Cl.
*G16H 30/20* (2018.01)
*G16Y 40/20* (2020.01)

(52) U.S. Cl.
CPC .............. *G16H 30/20* (2018.01); *G16Y 40/20* (2020.01)

(58) Field of Classification Search
CPC ................................ G16Y 40/20; G16H 30/20
See application file for complete search history.

(56) References Cited

U.S. PATENT DOCUMENTS

| 11,342,067 B1* | 5/2022 | Copperman | G16H 30/40 |
| 2004/0102689 A1* | 5/2004 | Metz | G16H 30/40 |
| | | | 600/407 |
| 2008/0046292 A1* | 2/2008 | Myers | G06F 16/283 |
| | | | 705/3 |
| 2011/0119088 A1 | 5/2011 | Gunn | |
| 2011/0138269 A1 | 6/2011 | Cordonnier | |
| 2011/0225176 A1 | 9/2011 | Siegel | |
| 2012/0102339 A1 | 4/2012 | Biondi | |
| 2016/0283665 A1 | 9/2016 | Sampath et al. | |
| 2016/0292374 A1* | 10/2016 | Hutchins | H04L 67/12 |

(Continued)

FOREIGN PATENT DOCUMENTS

WO 2021042077 3/2021

OTHER PUBLICATIONS

Lei Chang and Shaojun Yang, "Workflow-based large-scale integration hospital system," 8th International Conference on Computer Supported Cooperative Work in Design, Xiamen, China, 2004, pp. 626-630 vol. 1, (Year: 2004).*

(Continued)

*Primary Examiner* — Matthew L Hamilton
(74) *Attorney, Agent, or Firm* — SNELL & WILMER L.L.P.

(57) ABSTRACT

Systems and method are described to share large amounts of data in a secure and hierarchical manner across computer systems. The sharing process includes techniques to manage access to data and to manage physical storage locations throughout a hierarchy of computer systems. An intermediary level of storage may be provided to "cache" large data files to minimize repeated transfer of large data files throughout a given level of the hierarchy. For example, access from client devices will be served, when available, from an intermediary level rather than from a parent cloud system of stored data.

24 Claims, 13 Drawing Sheets

(56) References Cited

U.S. PATENT DOCUMENTS

| | | | | |
|---|---|---|---|---|
| 2016/0357918 | A1* | 12/2016 | Tochilnik | G06F 16/51 |
| 2018/0032573 | A1* | 2/2018 | Jarman | G16B 50/30 |
| 2018/0181712 | A1 | 6/2018 | Ensey et al. | |
| 2020/0089517 | A1* | 3/2020 | Paul | G06F 9/48 |
| 2020/0136933 | A1* | 4/2020 | Raskar | H04L 41/0806 |
| 2020/0159730 | A1 | 5/2020 | Jarman et al. | |
| 2020/0168309 | A1* | 5/2020 | Gaughan | G16H 40/67 |
| 2020/0294633 | A1* | 9/2020 | Namboodiri | G06F 16/88 |
| 2021/0343395 | A1* | 11/2021 | Pan | G16H 30/20 |
| 2022/0181005 | A1* | 6/2022 | Narvaez | G06F 12/0802 |
| 2024/0274281 | A1* | 8/2024 | Padmani | H04L 67/34 |

OTHER PUBLICATIONS

PCT International Search Report and Written Opinion dated Mar. 29, 2023, related to International Application No. PCT/US2022/050762 (10 pages).

The International Bureau of WIPO, International Preliminary Report on Patentability dated Jan. 12, 2024 in Application No. PCT/US2022/050762.

European Patent Office, European Search Report dated Sep. 3, 2025 in Application No. 22899349.9.

Kukhtevich II et al., "Aspects of the Development and Use of Organizational-structured Electronic Medical Documents in Automated Medical Systems", 2021 3rd International Conference on Control Systems, Mathematical Modeling, Automation and Energy Efficiency (SUMMA), IEEE, dated Nov. 10, 2021, pp. 440-444, XP034041770, DOI: 10.1109/SUMMA53307.2021.9632133 [retrieved on Nov. 30, 2021].

* cited by examiner

METHOD AND APPARATUS FOR CLINICAL DATA INTEGRATION

CROSS-REFERENCE TO RELATED APPLICATIONS

The priority of U.S. Application Ser. No. 63/282,919, filed Nov. 24, 2021, is hereby claimed under 35 U.S.C. 119 (e) and is incorporated by reference for all purposes.

STATEMENT REGARDING FEDERALLY SPONSORED RESEARCH OR DEVELOPMENT

Not applicable.

BACKGROUND

This section of this document introduces various information from the art that may be related to or provide context for some aspects of the subject matter described herein and/or claimed below. It provides background information to facilitate a better understanding of that which is disclosed and claimed herein. As such, this is a discussion of "related" art. That such art is related in no way implies that it is also "prior" art. The related art may or may not be prior art. The discussion in this section is to be read in this light, and not as admissions of prior art.

Sharing of clinical data (e.g., medical records) presents significant challenges. Some of these challenges include adherence to Health Insurance Portability and Accountability Act ("HIPPA") regulations. Another challenge is that the volume (e.g., overall size) of the data files present technological challenges with regard to upload/download and overall transmission of a cohesive set of related files. Other problems with regard to technical, legal, and security measures are also present.

Medical data can be handled by several standards that describe storage formats and transmission protocols. Among other data formats, there are Digital Imaging and Communications in Medicine ("DICOM"), Health Level 7 ("HL7") v2 and v3, HL7 Fast Healthcare Interoperability Resources ("FHIR") and HL7 Clinical Document Architecture ("CDA"). Despite of the data formats, some standards offer different transmission protocols like DICOM Message Service Element ("DIMSE") versus DICOMWeb, the latter with sub-variants like -URI, -WS and -RS.

Clinical data integration systems deal with all the variety of standards and their sub-variants and perform translations (also called mappings) between them. The usage of dictionaries is widely adopted.

While small practices may use a common set of map dictionaries for interoperability, bigger organizations have more specific demands. The customization of the mapping processes is usually performed by altering the dictionaries.

In addition to mere data translation, complex scenarios require different workflows for moving and replicating data for feeding diverse medical systems, each one with a different variant of the same information. The workflows determine the order of the sequence of activities, as well as exception handling.

The presently disclosed techniques and systems are directed to resolving, or at least reducing, one or more of the problems mentioned above. Even if acceptable solutions are available to the art to address these issues, the art is always receptive to improvements or alternative means, methods, and configurations. Thus, there exists a need for a technique such as that disclosed and claimed herein.

BRIEF DESCRIPTION OF THE DRAWINGS

The invention may be understood by reference to the following description taken in conjunction with the accompanying drawings, in which like reference numerals identify like elements.

Figure 1:
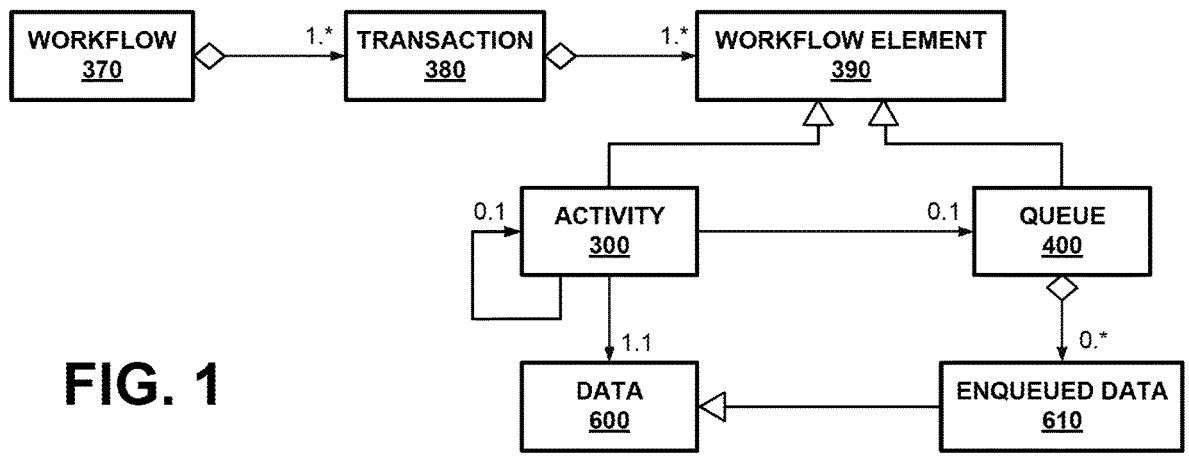
FIG. 1 represents the conceptual model of a workflow entity and its elements in accordance with one or more embodiments.

While different embodiments of this disclosure are susceptible to various modifications and alternative forms, the drawings illustrate specific embodiments herein described in detail by way of example. It should be understood, however, that the description herein of specific embodiments is not intended to limit this disclosure to the particular forms disclosed, but on the contrary, the disclosed embodiments may be varied to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described for every example in this specification. It will be appreciated that in the development of any such actual embodiment, numerous implementation-specific decisions will be be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The subject matter claimed below will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention.

Fast Healthcare Interoperability Resources ("FHIR") is a specification which is a standard for exchanging healthcare information electronically. Different medical devices are "acquisition devices" that take measurements of a patient and generate one or more data files representing the acquired data. For example, an X-ray machine may generate an image data file for each instance in which a diagnostician "takes" an X-ray. Many other types of medical acquisition machines are also used. These include, for example, machines to generate Magnetic Resonance Images ("MRIs") which utilize a different scanning technique than X-rays.

Additionally, other types of medical devices may acquire data for a given patient during a medical examination. Although there are many different types of machines and diagnostic tools available, the actual data contained within specific data files is not specifically important with respect to the needs for sharing that collected data. However, it is recognized that the different types of machines may collect data in different formats. Accordingly, an integration for these formats and continuity of managing related data files (data files that are related based on medical diagnostic needs as opposed to technical similarities) in a comprehensive workflow is addressed in this disclosure.

A mechanism for processing clinical data, either images or metadata, in a uniform way that can be described as a graph of activities with homogeneous inputs and output gates; amending the processed data; mapping individual data elements into other values; transforming datasets into a different clinical format; transmitting datasets using compatible communication protocols and formats; storing intermediate processing datasets into queues is described herein. Each activity is not dependent on preceding or subsequent activities, and the activity's behavior is governed by a set of parameters which can persist in a cloud-based Internet of Things ("IoT") configuration service as discrete components. With multiple processing queue compartments, it is not needed to maintain the state of each activity or entire transaction in case of severability; the IoT subsystem accomplishes this task by reporting the state of each queue. Overall, the mechanism allows an implementation specialist to alter a workflow without programming and redeploying a new software artifact.

Several components and aspects will be described through the accompanying illustrations which is not to be construed as limiting. As a further matter, numerous medical standards are mentioned in this document. However, this enumeration does not limit the scope of the invention with respect to the capacity to process information coming from other medical or non-medical standards.

The mechanism disclosed herein includes a software piece able to process medical data as a workflow engine that can be reconfigured dynamically. The workflow engine will read the configuration of the workflow, which is a directed acyclic graph ("DAG") with zero to one input and output gates.

Turning now to the drawings, within the scope of the present disclosure, a workflow entity 370 has a specific structure as depicted in the conceptual model of FIG. 1. A workflow 370 is composed of a set of Transactions 380 and a set of Workflow Elements 390. In general, a workflow 370 comprises one or more Transactions 380 and each Transaction 380 comprises execution of one or more Workflow Elements 390 with or on other Workflow Elements 390 as will be discussed further below.

Workflow elements 390 can be of two types: Activity elements 300 and Queue elements 400. Activity elements 300 perform a processing of a data object 600, which contain clinical or other medical information in any of the medical data formats mentioned herein. The various classes and subclasses of Activity elements 300 for one particular embodiment are illustrated in FIG. 4-FIG. 8 and discussed relative thereto.

The data object 600 may be, for example and without limitation, a radiological image or a patient's chart, in any medical data format. Available medical data formats include, but are not limited to, HL7 v2—all message types; HL7 v3—all message types; HL7 FHIR R4—all resource types; HL7 FHIR R5-resource types; HL7 CDA R2—all document types; DICOM (DIMSE)—all services; and DICOM (DICOMWeb)—all services. More generally, the technique disclosed herein may be extended to any medical data format now known to the art or to be developed hereafter.

On the other hand, Queue elements 400 administer the storage of data objects 600 until they are needed to be consumed by another Activity element 300. More particularly, a data object 600 is "enqueued", or placed in a queue, until needed for processing by an Activity element 300 whereupon it is "dequeued", or removed from the queue. In this case, the data is decorated as an Enqueued Data object 610, as opposed to a Dequeued Data object (not shown). Some embodiments may have more than one queue and may even segregate different kinds of data objects 600 into different queues. One embodiment in this disclosure, for instance, includes a "low-resolution" (or "lo-res") queue for low resolution data objects 600 and a "high resolution" (or, "hi-res") queue for high resolution data objects 600.

Workflow Elements 390 are implicitly grouped as Transactions 380, which is a conceptual-only class, depicting a sequence of consecutive activities between network transmissions or queue operations. For example, in the workflow 900 of FIG. 9, a first transaction will be defined as the sequence 311, 361, while the next one will be 321, 341, 332, 335, 333, 341, 331, 361, 331, 361 at its longest path. In the case of a transaction being interrupted, the transaction will be executed again entirely, starting from the last queue containing the data. While this approach is costly in terms of processing consumption, it simplifies the administration of the workflow states.

Figure 2:
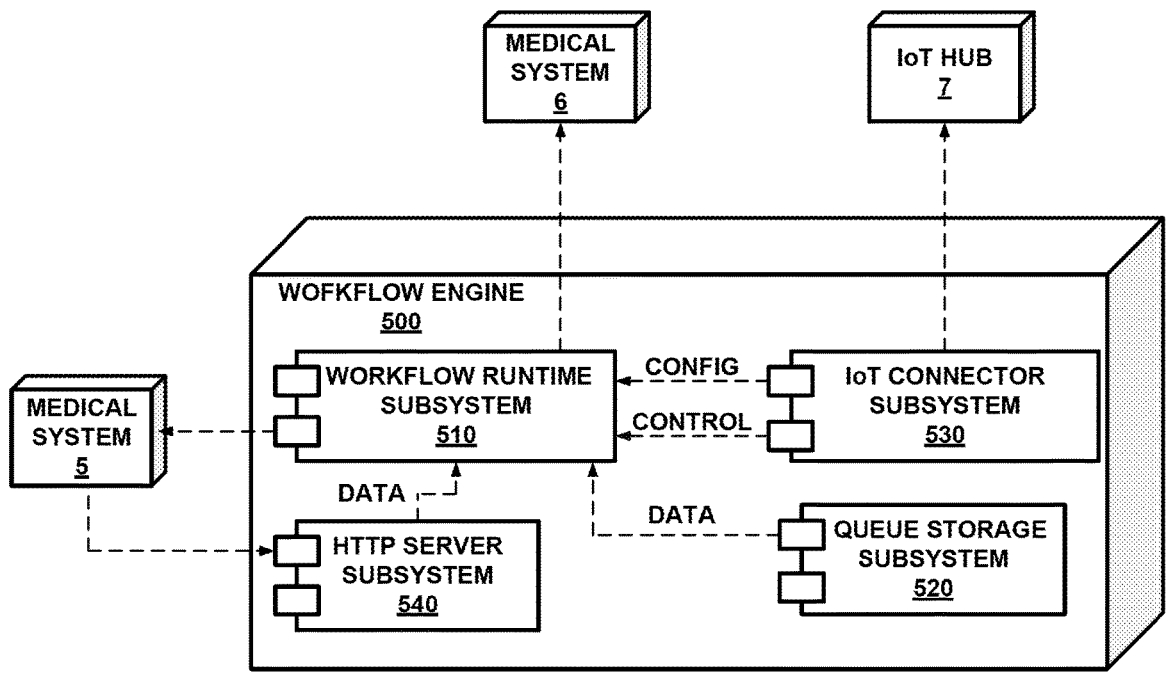
FIG. 2 depicts the internal components of a workflow engine, and their relationship with external entities, to implement the workflow entity of FIG. 1 in accordance with one or more embodiments.

FIG. 2 depicts the internal components of a Workflow Engine 500, and their relationship with external entities, to implement the workflow entity 370 of FIG. 1 in accordance with one or more embodiments. The internal components include a Workflow Runtime sub-system 510, a Queue Storage sub-system 520, an IoT Connector sub-system 530, and a Hypertext Transfer Protocol ("HTTP") Server subsystem 540. The external entities include a Medical System 5, a Medical System 6, and an IoT hub 7. Those in the art having the benefit of this disclosure will appreciate that the number and type of external entities may vary in other embodiments.

Those in the art having the benefit of this disclosure will also appreciate that the functionalities of the Workflow Engine 500 need not necessarily be implemented as described, that some functionalities may omitted, and that other functionalities may be added. For example, the functionalities of the Workflow Runtime sub-system 510 and the Queue Storage sub-system 520 need not necessarily be separated into separate subsystems in all embodiments. Similarly, the IoT Connector sub-system 530 may be omitted in embodiments that will not interface with the Internet. Furthermore, some functionalities that are routine but not germane to the presently disclosed technique are omitted for the sake of clarity and so as not to obscure that which is claimed below. Power management functionalities, for example, are omitted for this reason.

The Workflow Engine 500 executes the workflow by invoking the Workflow Runtime sub-system 510. Certain activities will be triggered by related events (e.g., receiving an object from a Medical System 5), and keep running sequentially until reaching a closing event (e.g., sending an object to another Medical System 6). The Workflow Runtime sub-system 510 generally executes tasks associated with the Activity elements 300 of the workflow entity 370 of FIG. 1. Workflow Engine 500 can execute many transactions in parallel using the Workflow Runtime sub-system 510 because the activities are stateless and reentrant.

The Queue Storage sub-system 520 performs several tasks related to storing a data object. These tasks may include: enqueue an object, per the request of an output activity, that shall serialize it beforehand; dequeue an object, per the request of an input activity, and mark it as in-process; remove an object, when it has been fully processed by a transaction; remove expired objects, according to a cleanup schedule. The Queue Storage sub-system 520 is therefore generally associated with execution of tasks associated with the Queue elements 400 within the workflow entity as described above.

The mission of the IoT Connector sub-system 530 is threefold. First, it retrieves from a cloud (not shown) the configuration of a workflow and deliver the configuration to the Workflow Engine 500. Second, it reports the status of each individual Queue to the IoT Hub 7. And, third, remotely controls the operation of the Workflow Engine 500 (pause, stop, restart, test).

The fourth subsystem is the HTTP Server subsystem 540, which exposes an HTTP endpoint that can be shared by many Input Activities. This component shares the same Transmission Control Protocol/Internet Protocol ("TCP/IP") port for more than one activity, each one with a different Uniform Resource Locator ("URL") path. For example, a DICOMWeb and a FHIR input activities can share port 443 with URL base paths/dicomweb and/fhir respectively. Activities employing this service will subscribe to the HTTP Server subsystem 540 and wait for messages coming to the associated base URL path.

Figure 3:
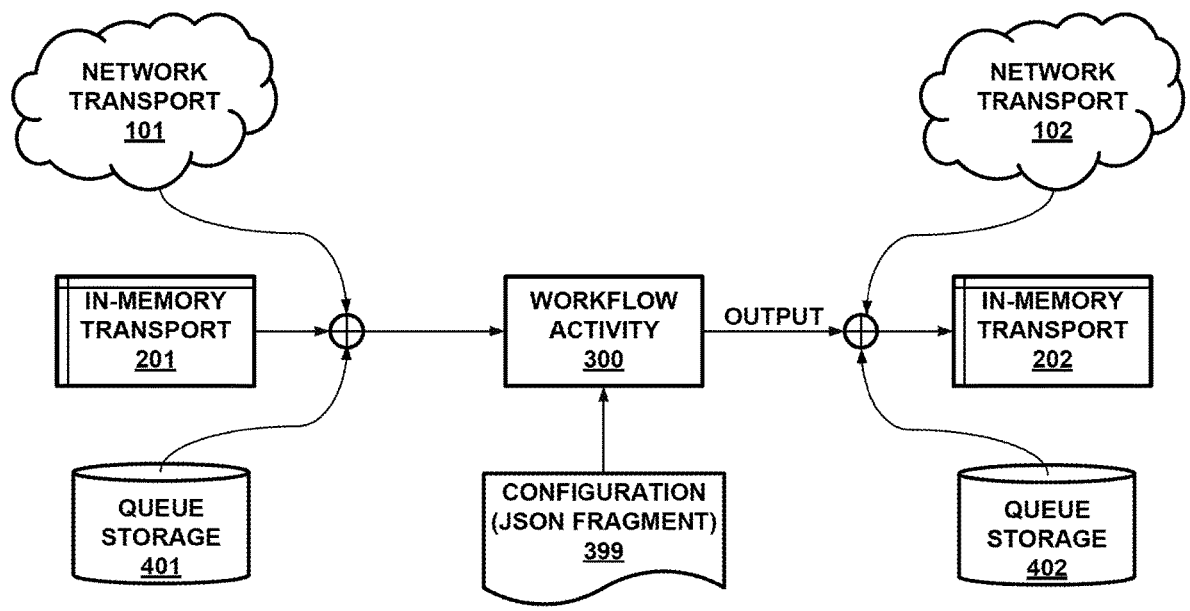
FIG. 3 is a flow diagram illustrating possible types of inputs and outputs of a workflow activity in accordance with one or more embodiments.

Activities enacted by the presently disclosed technique have a constrained design, as shown in FIG. 3. A workflow Activity element 300 accepts only one input Data object 600 containing the medical data to be processed by it: either coming from a Network Transport 101 (e.g., DICOM C-STORE or HL7 MLLP), from an In-Memory Transport 201 coming from a previous activity, or a Data object 600 dequeued from a Queue Storage 401. At the output of the Activity element 300, a Data object 600 can be stored simultaneously in a Queue Storage 402, while sent to a Network Transport 102 or an In-Memory Transport 202 to the next consecutive activity.

Figure 4:
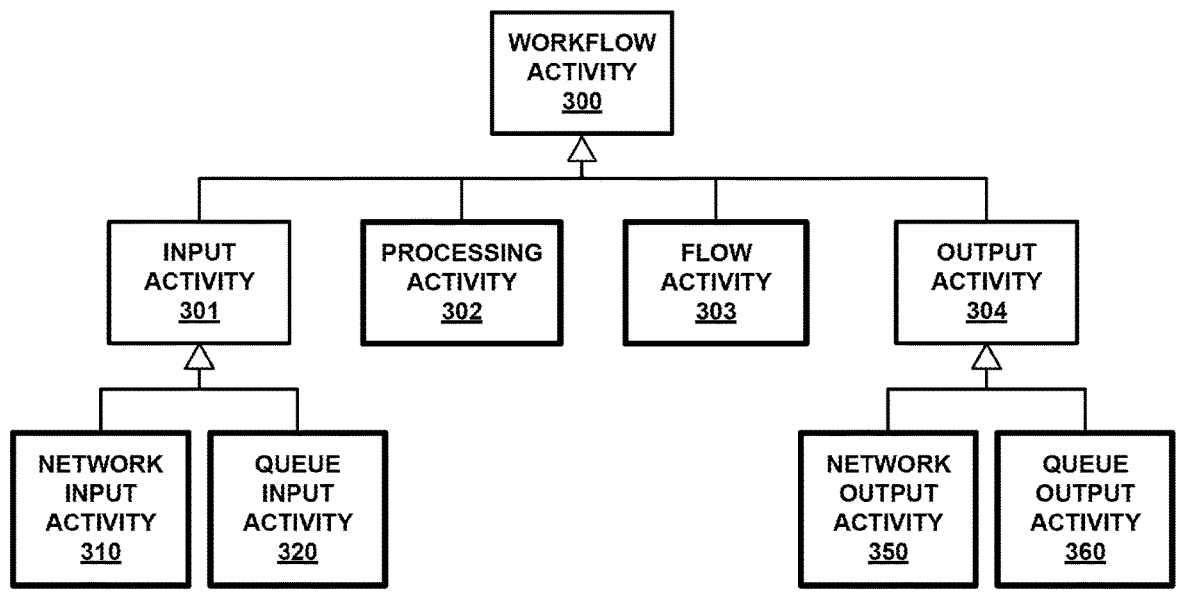
FIG. 4 is a class diagram illustrating the first and second level of activity classes, all of them abstract.

The specific processing to be done within the workflow Activity element 300 is determined by the type of activity (see FIG. 4-FIG. 8) and the Configuration 399 parameters particular to that activity instance. FIG. 4 describes a closed taxonomy for the Workflow Activity classes in this particular embodiment. All concrete activity classes are derived from the highlighted abstract classes-namely, the Network Input Activity class 310, the Queue Input Activity class 320, the Processing Activity class 302, the Flow Activity class 303, the Network Output Activity class 350, and the Queue Output Activity class 360.

Classes derived from the Input Activity class 301 receive a data object by any means, but will not process the data, with exception of deserialization tasks. There are two derived abstract classes in this embodiment: Network Input Activity class 310, which listens a network port for receiving an object using any transmission protocol; and Queue Input Activity class 320, that extracts an object from a queue, when available. Input activities are governed by the following rules: never receive a data object from memory, always output the data object in-memory, and never store the mentioned object in a queue. That is, the data object may be processed in Random Access Memory ("RAM") and passed from one Activity to another without using other temporary mass storage.

The abstract Processing Activity class 302 is a base for all activities processing a data object. Among others, but not restricted to them are: amending the processed data; altering individual data elements with other values; and transforming datasets into a different clinical data format. Processing activities comply with the following rules: always receive a data object from memory and output the processed data object in-memory.

The abstract Flow Activity class 303 represent all derived activities that can alter the course of a transaction, based on certain configured criteria. Flow activities have one input and one or many outputs, all of them of type in-memory. This is the unique kind of activity with multiple outputs.

Finally, classes derived from the Output Activity class 304 are intended to send a data object out of the scope of the transaction sequence, by either sending the data object through a network transmission, as with Network Output activity class 350, or storing it in a queue, as with Queue Output activity class 360. All output activities receive a data object from memory.

Figure 5:
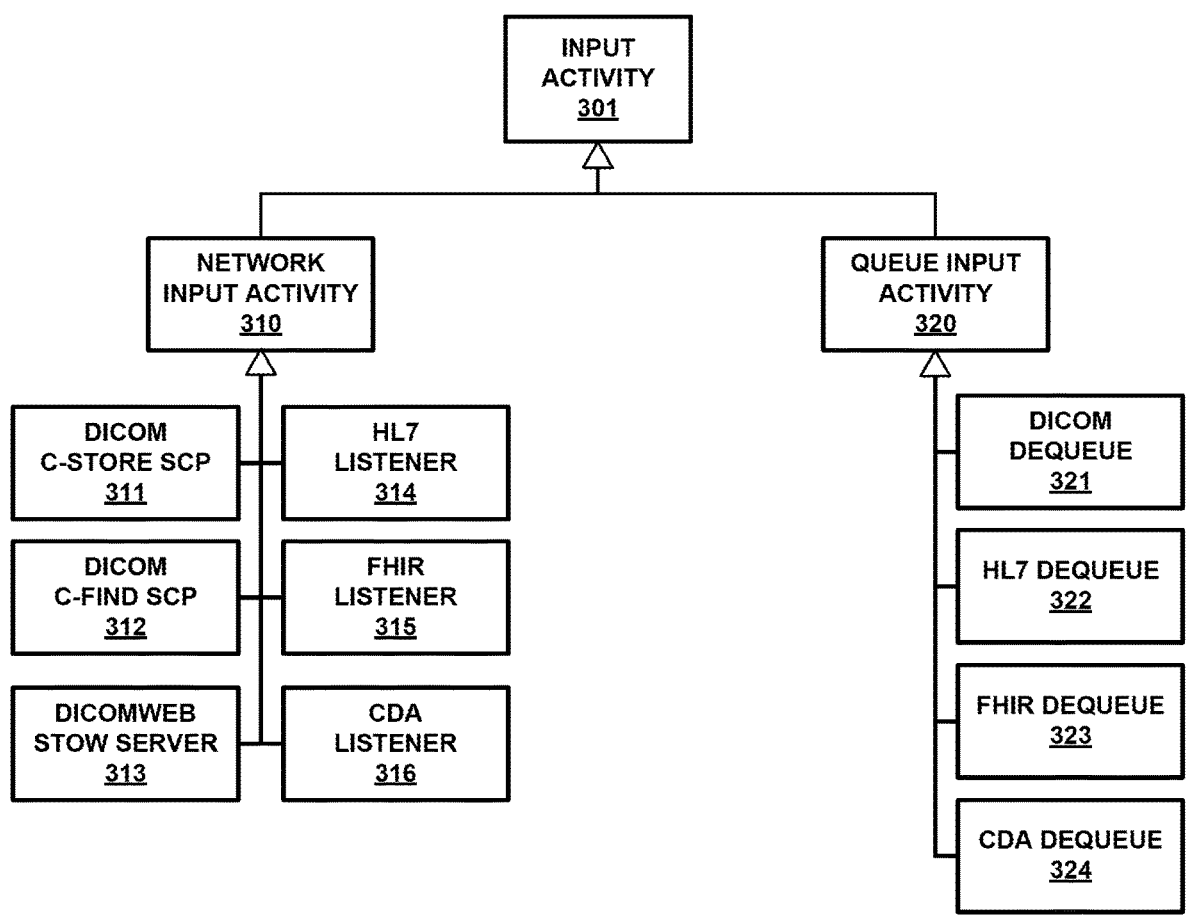
FIG. 5 is a class diagram illustrating concrete activity classes derived from the abstract type Input in FIG. 4.

FIG. 5 lists a broad but not restrictive set of activity classes derived from the Input Activity class 301, and its unique immediate derivatives Network Input Activity 310 and Queue Input Activity 320. Subsequent figures will present similar information for other base activity classes, under the same non-restrictive premise. The first three concrete activities are related to a group of Digital Imaging and Communication in Medicine ("DICOM") standards. The content of the data is related to, but not constrained to, radiology images and is encoded in binary format.

The DICOM C-STORE SCP Activity 311 implements the corresponding DICOM DIMSE service and waits for an incoming C-STORE message. It may also implement the C-ECHO service for diagnostic purposes. There is no specific limitation for the content of the message received through this service, which is then passed to an in-memory output without any validation despite of the structure of the content. Among its configuration parameters are the IP Address, TCP/IP Port and AE Title.

Figure 10:
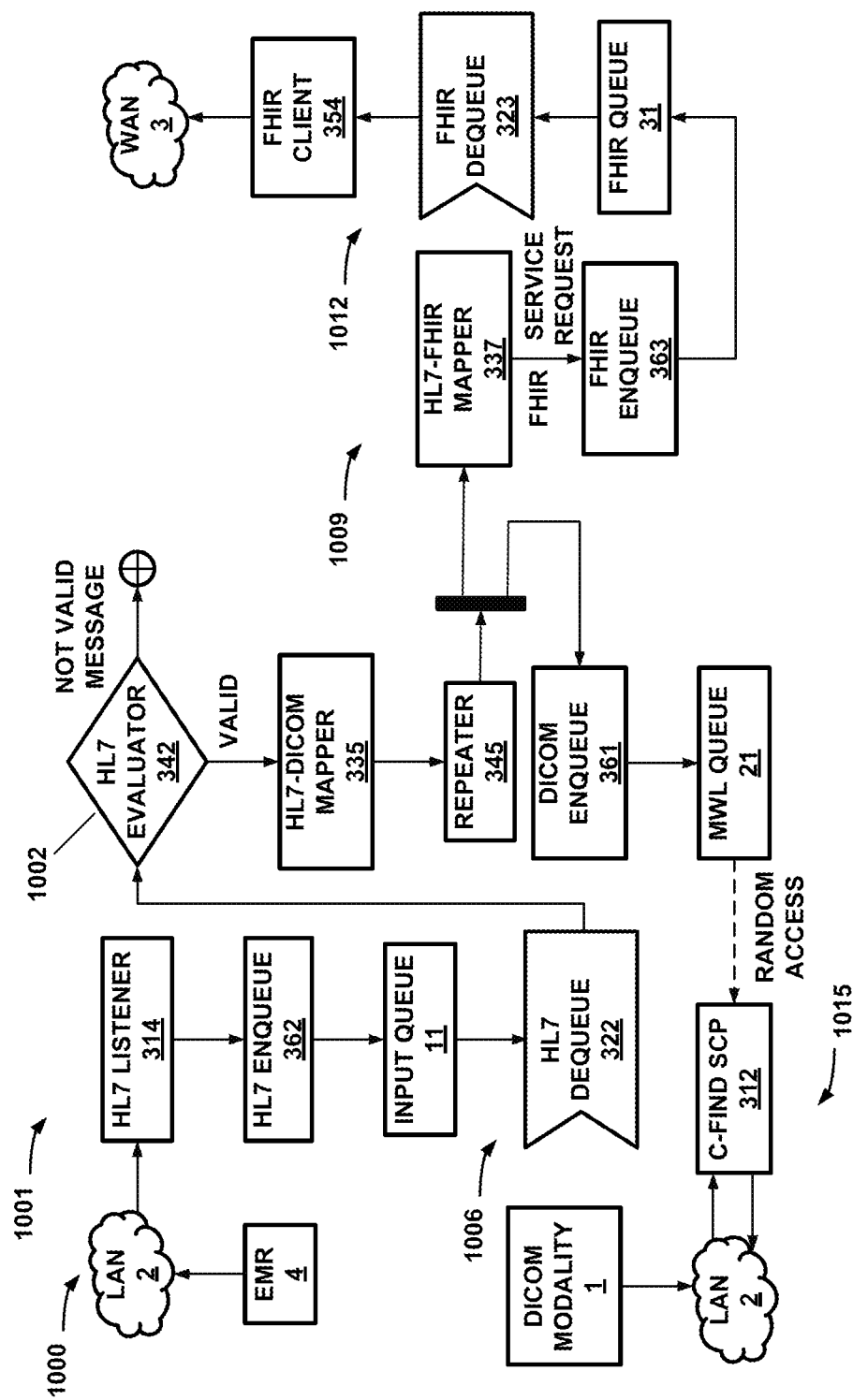
FIG. 10 is a sample workflow for HL7 Orders translated into DICOM Modality Worklist ("MWL") records, that can be queried via DICOM C-Find protocol.

The DICOM C-FIND SCP Activity 312 implements the corresponding DICOM DIMSE service and waits for an incoming C-FIND request. As with its C-STORE sibling, it may also implement the C-ECHO service. It also has similar parameters like the IP Address, TCP/IP Port and AE Title, as well as a reference to a queue containing a collection of DICOM studies, which is accessed randomly without dequeuing its elements. This activity does not output any data through the output gate but responds to the interrogating entity through the Input gate. An example is shown in FIG. 10 (lower left corner).

The DICOMWeb Store Over the Web ("STOW") Server Activity 313 complies fully or partially with the corresponding web-based Standard. As its DICOM C-STORE counterpart, there is no specific limitation for the content of the message received through this service. Once a DICOM object is received, it is sent it to an in-memory output. Being an HTTP service, the minimum parameters to configure are IP Address, HTTP/S Port, and URL path.

The next three activities derived from Network Input Activity 310 are related to HL7 (Health Level Seven) standards. Unlike the previous activities, the content is textual and human-readable. The three activities are the HL7 Listener Activity 314, the FHIR Listener Activity 315, and the CDA Listener Activity 316.

The HL7 Listener Activity 314 opens a TCP/IP Port for listening HL7 v2 messages, optionally wrapped with Minimal Lower Layer Protocol ("MLLP") control characters. It may also implement Hybrid Lower Layer Protocol ("HLLP") to help verify message integrity. This activity will not evaluate the content of the HL7 message but just verify the conformance at the structural level. After the verification passes, the message is sent unaltered to the in-memory output. This activity can optionally respond to the sender and the Acknowledge ("ACK") or Not Acknowledge ("NACK") message. This activity class employs at least the following parameters: IP Address, TCP/IP port, and flags for validating and returning ACK/NACK.

The FHIR Listener Activity 315 provides a web service compliant with the HL7 Fast Healthcare Interoperability Resources ("FHIR") standard. The implementation of the service may be full or partial. However, it is expected that the service will receive any FHIR Resource type without limitation beyond the validation of the data schema. The responses provided by this activity at the Input port are determined by the HTTP and FHIR rules. Once a resource is received, it is sent to the in-memory output. Being an HTTP service, the minimum parameters to configure are IP Address, HTTP/S Port, and base URL path.

The CDA Listener Activity 316 implements an HTTP endpoint for receiving HL7 Clinical Document Architecture ("CDA") documents and its derivatives, like Consolidated-Clinical Document Architecture ("C-CDA") and Continuity of Care Document ("CCR") documents. Although the CDA standard does not specify how documents are transported, this implementation uses HTTP, which does not limit other implementations to extract CDA documents from HL7 v2 messages, DICOM files or email attachments, among others. The received document will have a minimum Extensible Markup Language ("XML") schema validation before sent to the in-memory Output. Being an HTTP service, the minimum parameters to configure are Internet Protocol ("IP") Address, HTTP/S Port, and base URL path.

The abstract class Queue Input Activity 320 is the base for several concrete activities that perform the same fundamental task: to extract a data object from a queue and deserialize it. All objects are stored in queues as physical or virtual files, without any awareness of their internal structure. Queue Input Activities share the same input and output rules: they have an Input of type queue and an output to memory. The input is event-based. That is, the activity will be enacted whenever a new element is pending to be processed. The next available element will be processed after the transaction associated to the previous one is completed. All activities derived from Queue Input Activity employ at least one parameter pointing a specific storge queue by its name.

The DICOM Dequeue activity 321 extracts and deserializes a DICOM object from a queue without any validation regarding the object type or content. The main goal of the activity is to deserialize the object, parse it, and put it on a memory structure that is easy to consume by other activities.

In a similar fashion, the HL7 Dequeue activity 322 extracts, deserializes, and parses an HL7 message to put it in a memory structure organized in segments, components, and fields. There is no validation for compliance of the content against the HL7 standard, as there is another activity with capability.

The FHIR Dequeue activity 323 performs the same steps for extracting and deserializing a FHIR resource, which can be formatted as a JavaScript Object Notation ("JSON") or an XML content. Once decoded, the resource will be stored in memory in a hierarchical structure of elements, without any dependency on its original format.

Finally, the CDA Dequeue activity 324 will extract and deserialize a CDA-related document, which is formatted as an XML content. Only minimal checks against XML and CDA will be performed during this step, before being stored into an in-memory structure, for further processing.

Figure 6:
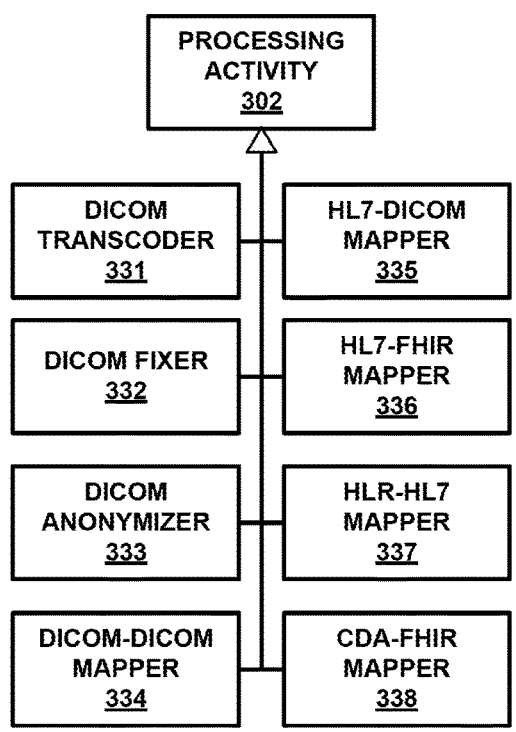
FIG. 6 is a class diagram illustrating concrete activity classes derived from the abstract type Processing in FIG. 4.

The classes depicted in FIG. 6, derived from the Processing Activity class 302, comprise an open set of activities that perform transformations on the processed data objects. Each class is specialized in a particular input and output data type. These classes include, in this particular embodiment, the DICOM Transcoder Activity 331; the DICOM Fixer activity 332; the DICOM Anonymizer activity 333; the DICOM-DICOM Mapper Activity 334; the HL7-DICOM Mapper Activity 335; the HL7-FHIR Mapper Activity 336; the HL7-HL7 Mapper Activity 337; and the CDA-FHIR Mapper Activity 338.

The DICOM Transcoder Activity 331 converts the transfer syntax (e.g., the image format and encoding) of an image contained within the DICOM object. Therefore, both the input and the output of this activity are DICOM objects. The operational parameter for this activity is the transfer syntax unique identifier ("UID"), according to the DICOM standard (e.g., 1.2.840.10008.1.2.4.80 for JPEG-LS Lossless Image Compression).

The purpose of the DICOM Fixer Activity 332 is to amend common issues in the metadata of DICOM objects (e.g., malformed dates, strings ending in space or null characters, and invalid empty tags). Both the input and the output for this activity is a DICOM object. The configurable parameters may indicate what kind of fixes to perform.

The DICOM Anonymizer Activity 333 is another activity performing a pure DICOM operation. The anonymization process is executed based on de-identification profiles, as proposed by the Integrating the Healthcare Enterprise ("IHE") Information Technology ("IT") Infrastructure Technical Committee. The profile, indicating which DICOM tags to de-identify and how to do it, is provided in a parameter for the activity as a textual table.

The DICOM-DICOM Mapper Activity 334 completes the set of pure-DICOM processing activities. Its goal is to alter specific tags with values coming from other tags, or with literals. The parameter for this activity is a textual table of tags and replacements values (e.g., references to other DICOM tags or literal strings).

The next processing activity is HL7-DICOM Mapper Activity 335, which creates a DICOM dataset based on a list of literals and values coming from an HL7 message. Therefore, the input of the activity is an HL7 message and the output a DICOM object, both in-memory. The parameter for this activity is a textual table of DICOM tags and fill in values (e.g., references to HL7 message fields or literal strings).

The HL7-FHIR Mapper Activity 336 performs a conversion of an HL7 message into a FHIR Bundle resource, containing several resources of different types depending on the specific content of the HL7 segments. Thus, the input object is the HL7 message and the output the mentioned FHIR resource. At minimum, this activity does not require any configuration parameter.

The HL7-HL7 Mapper Activity 337 acts in a similar fashion to the DICOM-DICOM Mapper, copying values from one field to other, or assigning literal values. Both the input and the output are HL7 messages, and the configuration parameter is a textual table containing references to the destination fields, and either a reference to another field or a literal value.

Finally, the CDA-FHIR Mapper Activity 338 behaves in a similar fashion to the HL7-FHIR Mapper, converting a CDA document into a FHIR Bundle resource, containing several resources of different types depending on the specific content of the CDA document sections. The input is a CDA document, while the output is a FHIR resource. As conversion equivalences are well known, this activity does not require any configuration parameter.

Figure 7:
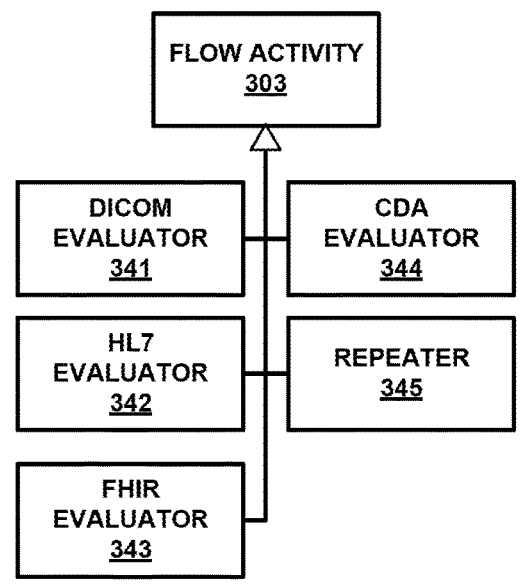
FIG. 7 is a class diagram illustrating concrete activity classes derived from the abstract type Flow in FIG. 4.

FIG. 7 represents a set of activity classes derived from the Flow Activity, which can alter the course of the transaction based on some object value. For the first four presented activities, the possible outputs are two: one in case the evaluation result is true, and the other when it is false. The evaluation is performed by comparing a specific element in the processed object against a reference to other elements values or a literal value, with the participation of a comparison operand (e.g., equal, not equal, greater than, lesser than, is null, etc.).

Thus, the DICOM Evaluator Activity 341 will evaluate the content of a DICOM tag, the HL7 Evaluator activity 342 will evaluate an HL7 field in a message segment, the FHIR Evaluator activity 343 will analyze the value of an element given its expression or path, and the CDA Evaluator activity 344 will take a value from and XML element inside the document.

The last flow activity is the Repeater Activity 345, which sends any object coming from the activity input to multiple outputs, without any kind of processing. The activities following a repeater become new transactions and can be reenacted individually after a failure in the workflow infrastructure. If the object used as an input for the Repeater activity comes from a queue, that object will remain locked in the queue until all associated transactions are completed.

Figure 8:
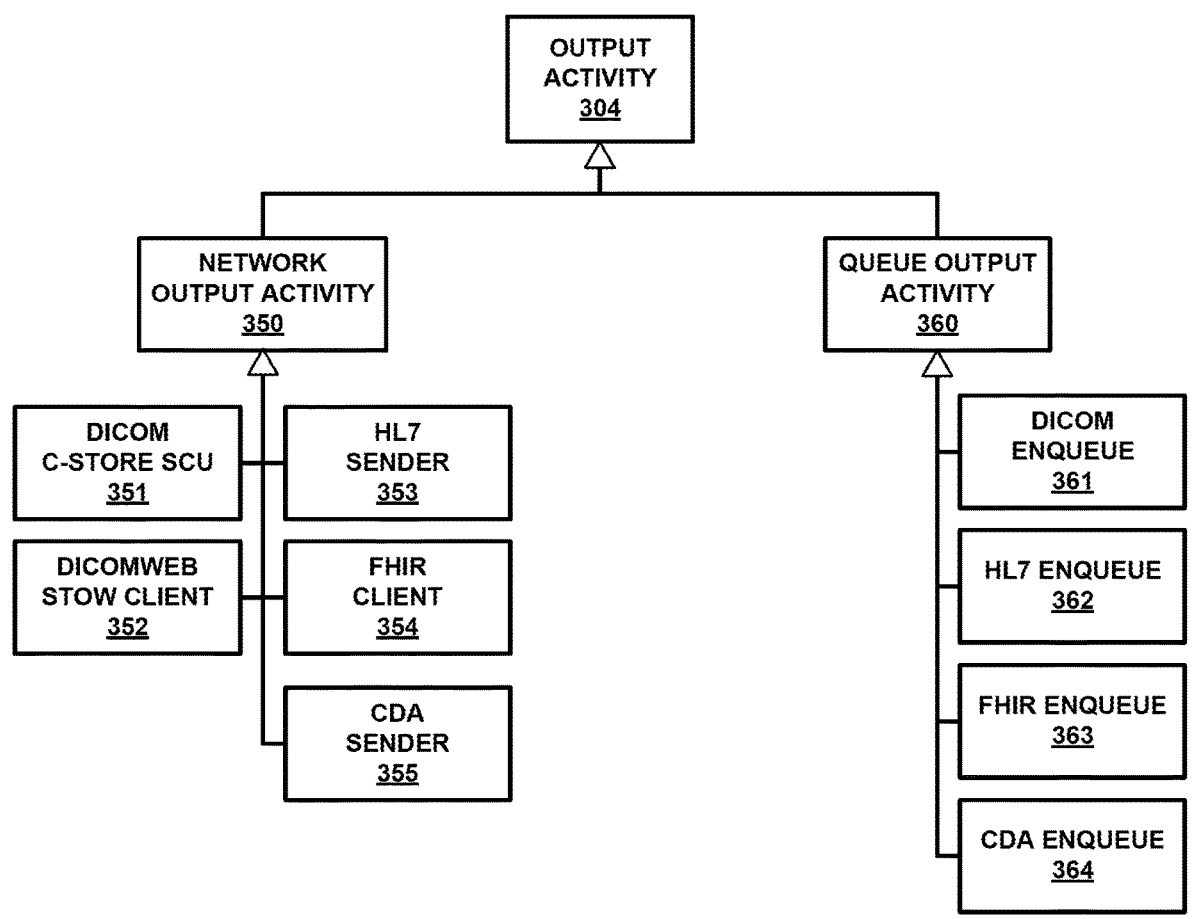
FIG. 8 is a class diagram illustrating concrete activity classes derived from the abstract type Output in FIG. 4.

In FIG. 8, several activity classes derived from the Output Activity class 304 are presented. As mentioned before, this activity inherits two abstract classes related to different output targets. The two abstract Output Activity classes are the Network Output Activity class 350 and the Queue Output Activity class 360.

The first class under the Network Output Activity class 350 is the DICOM C-STORE SCU activity 351. Its purpose is to send a DICOM object (not shown) to a DICOM DIMSE C-STORE SCP, typically a local Picture Archiving and Communication System ("PACS") (also not shown). The activity parameters include network information (e.g., IP Address, IP Port) as well as DICOM-related information, like source and destination AE Titles.

The DICOMWeb STOW Client Activity 352 is the web-based counterpart of the previous output activity. The input is a DICOM object (not shown), but the DICOM object is sent to an imaging server (also not shown) using a different protocol. The parameters indicate the destination endpoint as a fully qualified HTTP URL with path, and additional HTTP headers. Other parameters may include credentials for accessing the DICOMWeb server.

With the HL7 Sender Activity 353, it will be possible to take an HL7 message (not shown) from the input and send it to a remote TCP/IP endpoint. The operational parameters for this activity include the IP Address and the IP Port, at least. Other parameters may be related of the type of message wrapper (e.g., MLLP, HLLP, or none).

The FHIR Client Activity 354 allows to send a FHIR resource (not shown) coming from the activity input to a destination FHIR server (also not shown). The parameters indicate the destination endpoint as a fully qualified HTTP URL with path, additional HTTP headers, an HTTP verb (e.g., POST, PUT, DELETE, PATCH). Extra parameters may include the preferred content format (e.g., XML or JSON) and credentials for accessing the FHIR server.

Finally, the CDA Sender Activity 355 represents an activity able to send a CDA document (not shown) coming from the activity input to an HTTP destination (also not shown). This specific implementation does not limit the workflow engine to support other kinds of transmissions (e.g., TCP or email). The parameters indicate the destination endpoint as a fully qualified HTTP URL with path, and additional HTTP headers, and optionally credentials for accessing the DICOMWeb server.

The abstract class Queue Output Activity class 360 comprises several derived activities related to moving clinical data objects to a processing queue. All of them will move the object received at the activity input to a designated queue in their parameter list, and optionally continue the flow by passing the same object to the next activity. In the latter case, even though the flow continues, the current transaction is considered to be completed, and therefore, if the object was extracted from another queue, it will be completed removed from it at that moment.

Thus, the DICOM Enqueue Activity 361 is specialized in serializing a DICOM object (not shown) and move it to a queue (also not shown), the HL7 Enqueue activity 362 will serialize an HL7 message, the FHIR Enqueue Activity 363 will do the same with a FHIR resource (not shown), and the CDA Enqueue Activity 364 will enqueue a CDA document (not shown).

For a better understanding on how the Workflow Engine and its activities work, there are two examples provided in this document, depicting realistic cases using the DICOM, DICOMWeb, HL7 and FHIR standards. These examples are illustrative only, and are not to be considered limiting. Other implementations are also possible.

Figure 9:
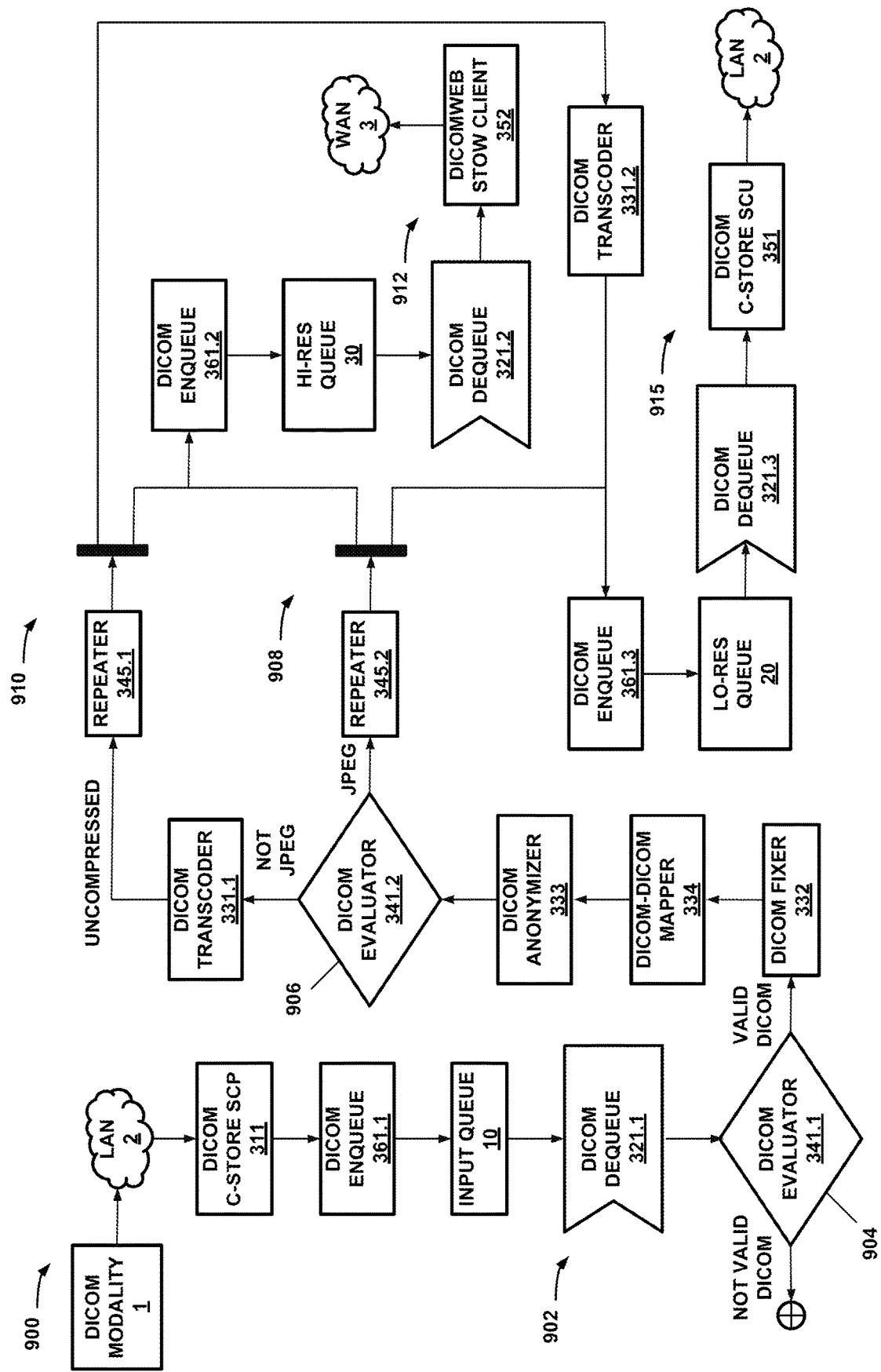
FIG. 9 is one example of workflow for demonstrating the reception and processing of DICOM images and upload to two DICOMWeb servers.

FIG. 9 presents an example of a workflow 900 including an ingestion of DICOM images and transcoding to high-resolution and low-resolution versions before uploading to different endpoints. In a first transaction 900, the process starts in a DICOM Modality 1 sending images (e.g., radiology or MRI images) through a Local Area Network ("LAN") 2. At the Workflow Engine side, a DICOM C-STORE SCP activity 311 will receive the images and a DICOM Enqueue activity 361.1 will send them immediately to the Input Queue 10, without any processing. This approach speeds up the reception of the images from the modality point of view. The first transaction 900 ends at this point.

A second transaction 902 starts whenever the DICOM Dequeue activity 321.1 can dequeue an incoming DICOM object. The object is evaluated (at 904) for certain conditions by a DICOM Evaluator Activity 341.1 (e.g., if the DICOM object contains pixel data), and discarded if is not valid for the purposes of the workflow. If the object is valid, the object is passed through several transformation activities: The DICOM Fixer Activity 332 will amend uncompliant tags, the DICOM-DICOM Mapper Activity 334 will fill in empty tags and move information to required tags from others. Finally, the DICOM Anonymizer Activity 333 will de-identify the private patient information, according to a de-identification profile (not shown).

Whenever all the metadata is ready, the DICOM image will be analyzed (at 906) in a DICOM Evaluator Activity 341.2 to determine if it contains a JPEG (low resolution image) or any other transfer syntax. In case the image is not a JPEG, it will be transcoded to an uncompressed format called VR Explicit Little Endian, in the first DICOM Transcoder Activity 331.1. The resulting image is used twice by a Repeater Activity 345.1, which starts a new transaction 910, with the following output: one for passing the image to a DICOM Enqueue Activity 361.2 associated to the queue 30, denominated "Hi-res", and the other output connects to a second DICOM Transcoder Activity 331.2 for converting the image to a JPEG, and then enqueue the converted image into the queue 20 called "Lo-res" by the DICOM Enqueue Activity 361.3.

A different circuit is traveled for another transaction 908 whenever the output at DICOM Evaluator Activity 341.2 determined (at 906) that the image is JPEG. In that case, a Repeater Activity 345.2 starts a new transaction 908 and will enqueue the image in two queues reusing the DICOM Enqueue Activity 361.2 for the "Hi-res" queue 30, and DICOM Enqueue Activity 361.3 for the "Low-res" queue.

The "Hi-res" queue 30 is consumed by DICOM Dequeue Activity 321.2, which starts a new transaction 912 and feeds a DICOMWeb STOW Client Activity 352 for sending the image to a web-service through a Wide Area Network ("WAN") 3. The DICOM Dequeue Activity 321.3 monitors the "Low-res" queue and, in a new transaction 915, extract new images for sending them to the DICOM C-Store SCU Activity 351, which forward the image to a local DICOM destination (not shown) through the LAN 2.

FIG. 10 represents a workflow 1000 receiving HL7 clinical orders for imaging from an Electronic Medical Records ("EMR") system 4 and feeding a radiology modality with the worklist of orders using DICOM protocol. In parallel, the orders are sent to a cloud repository (not shown) as FHIR resources.

The entry point for this workflow 1000 is the transaction 1001, which begins with an HL7 Listener Activity 314, which receives HL7 Order Message ("ORM") messages from an EMR system 4 through the Local Area Network 2. The messages are stored in an input queue 11 by the HL7 Enqueue Activity 362. The transaction 1001 ends at this point.

The next transaction 1006 starts whenever an HL7 messages is extracted from the input queue by the HL7 Dequeue Activity 322 and checked for validity by the HL7 Evaluator Activity 342 (at 1002). If the message is not valid (e.g., not an ORM message), the transaction is terminated.

Once validated (at 1002), the HL7 message is converted into a DICOM object by the HL7-DICOM Mapper Activity 335, according to a translation map provided as its parameter. The output is then pass through a Repeater Activity 345 for parallel processing. The first one will store the new DICOM object into a queue 21 by the DICOM Enqueue Activity 361.

The second circuit for another transaction 1009 starts from the repeater and converts the ORM message into a FHIR ServiceRequest resource by the HL7-FHIR Mapper Activity 336. The new resource is then stored into the FHIR queue 31 by the FHIR Enqueue Activity 363, as the final step in this transaction 1009.

In a different transaction 1012, the FHIR Dequeue Activity 323 will extract the FHIR resource and sent to a cloud server (not shown) through the WAN 3 by using the FHIR Client Activity 354.

Lastly, an isolated transaction 1015 is performed by a single DICOM C-FIND Activity 312. This activity has a particular behavior: it does not have an output and reads the MWL queue 21 with random access and without dequeuing the objects. Once the activity receives a request sent by a Modality 1 through the LAN 2, it searches for the entries that comply with the find operation filter and returns the result through the input channel.

Figure 11:
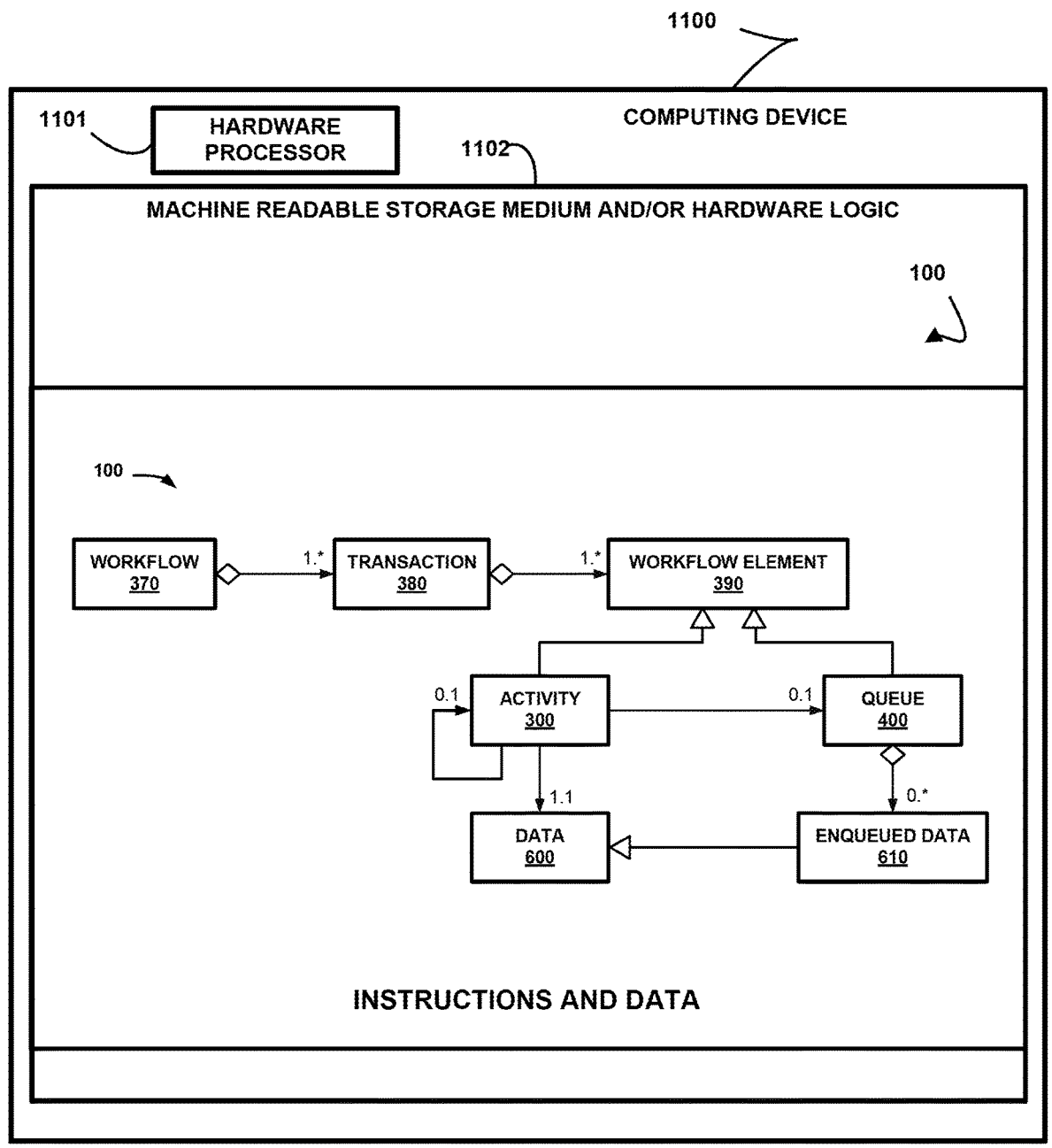
FIG. 11 illustrates a machine-readable storage medium having instructions stored thereon to perform any of the above sample workflows.

Referring now to FIG. 11, shown is an example computing device 1100, with a hardware processor 1101, and accessible machine-readable instructions stored on a machine-readable medium and/or hardware logic 1102 that may be used to perform one or more functions of the clinical data workflow engine cloud-based or distributed application, according to one or more disclosed example implementations. Specifically, FIG. 11 illustrates computing device 1100 configured to implement the workflow entity 370 of FIG. 1 so that the computing device 1100 may execute the example workflows 900 in FIGS. 9 and 1000 in FIG. 10, for example. However, computing device 1100 may also be configured to perform the flow of other methods, techniques, functions, or processes described in this disclosure.

In this example of FIG. 11, machine-readable storage medium 1102 includes instructions to cause hardware processor 1101 to perform blocks discussed above with reference to the different control flows. Different implementations of the workflow entity 370 are possible, including hardware logic configured on a chip to implement all or part of workflow entity 370 in conjunction with an overall implementation of disclosed techniques to provide a cloud-based or hierarchically distributed clinical data workflow engine application.

The hardware processor 1101 may be any suitable processor known to the art. As those in the art having the benefit of this disclosure will appreciate, the hardware processor

1101 may be implemented using a Central Processing Unit ("CPU"), a Digital Signal Processor ("DSP"), or even a processor chipset. These examples are illustrative only and not limiting. Still other implementations of the hardware processor 1101 may be realized in other embodiments.

A machine-readable storage medium, such as 1102 of FIG. 11, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory ("EPROM"), random access memory ("RAM"), non-volatile random access memory ("NVRAM"), optical disk, solid state drive ("SSD"), flash memory chips, and the like. The machine-readable storage medium may be a non-transitory storage medium, where the term "non-transitory" does not encompass transitory propagating signals.

Figure 12:
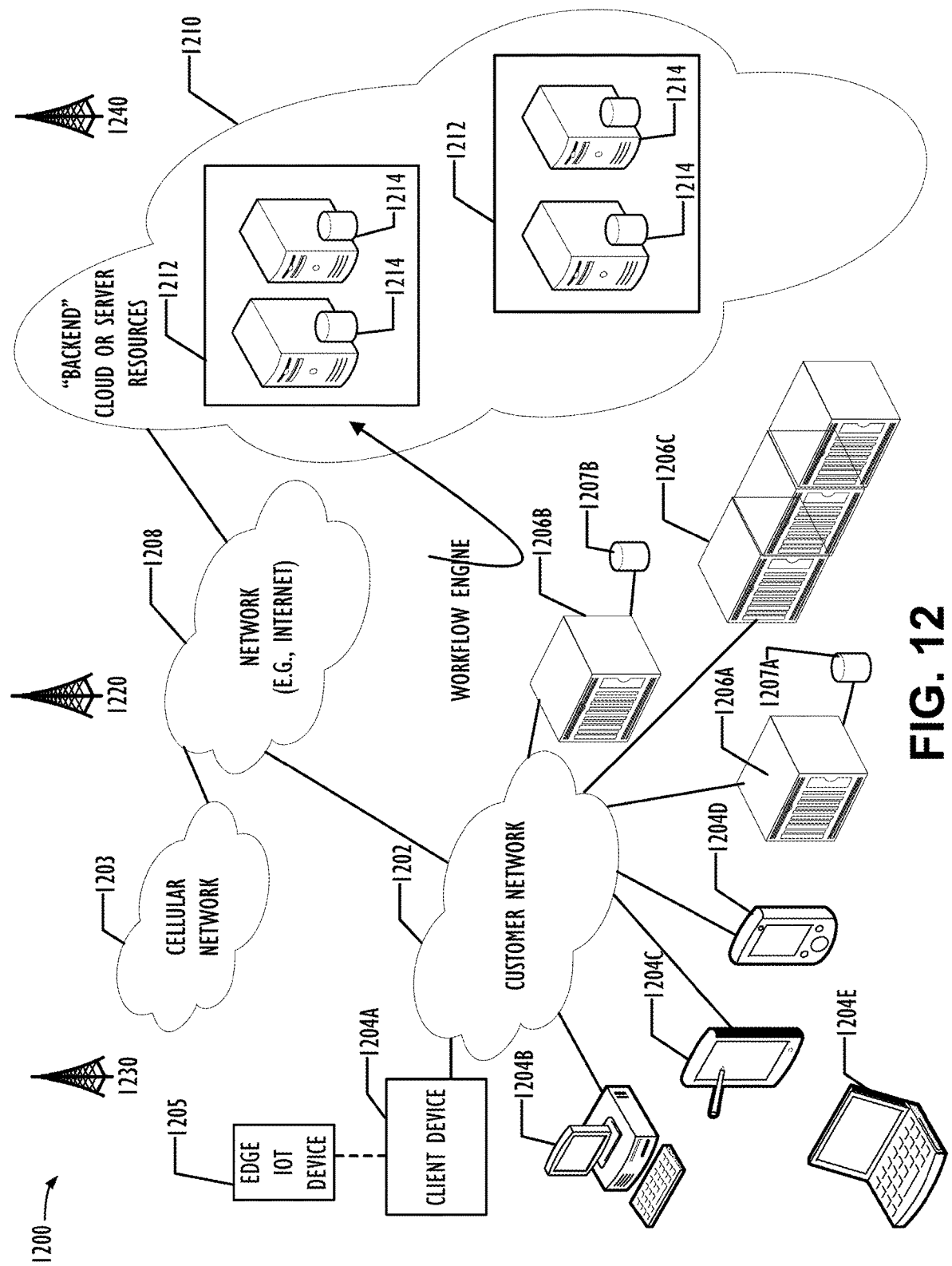
FIG. 12 is a system diagram illustrating a hierarchy of computer systems that may be used to implement the systems and methods disclosed herein.

FIG. 12 represents a network infrastructure 1200 that may be used to implement all, or part of the disclosed cloud-based or hierarchically distributed clinical data workflow engine application, according to one or more disclosed embodiments. Network infrastructure 1200 includes a set of networks where embodiments of the present disclosure may operate. Network infrastructure 1200 comprises a customer network 1202, network 1208, cellular network 1203, and a cloud service provider network 1210. In one embodiment, customer network 1202 may be a local private network, such as local area network ("LAN") that includes a variety of network devices that include, but are not limited to switches, servers, and routers.

Each of these networks can contain wired or wireless programmable devices and operate using any number of network protocols (e.g., TCP/IP) and connection technologies (e.g., WIFI® networks, or BLUETOOTH®). In another embodiment, customer network 1202 represents an enterprise network that could include or be communicatively coupled to one or more local area networks ("LANs"), virtual networks, data centers and/or other remote networks (e.g., 1208, 1210). In the context of the present disclosure, customer network 1202 may include one or more high-availability switches or network devices using methods and techniques such as those described above. Specifically, compute resource 1206B and/or compute resource 1206A may be configured as a network infrastructure device incorporating storage devices (e.g., 1207A and 1207B).

As shown in FIG. 12, customer network 1202 may be connected to one or more client devices 1204A-E and allow the client devices 1204A-E to communicate with each other and/or with cloud service provider network 1210, via network 1208 (e.g., the Internet). Client devices 1204A-E may be computing systems such as desktop computer 1204B, tablet computer 1204C, mobile phone 1204D, laptop computer (shown as wireless) 1204E, and/or other types of computing systems generically shown as client device 1204A. In the examples of this disclosure, it is likely the different user types outlined in FIG. 12 may obtain access to the clinical data workflow engine as a cloud-based application via a client device such as those illustrated in network infrastructure 1200.

Network infrastructure 1200 may also include other types of devices generally referred to as Internet of Things ("IoT") (e.g., edge IoT device 1205) that may be configured to send and receive information via a network to access cloud computing services or interact with a remote web browser application (e.g., to receive information or respond to requested information). In some implementations edge IoT device 1205 may provide information to assist in automated task validation. Specifically, if maintenance is performed at a property and information pertaining to that maintenance is available to edge IoT device 1205 then that information may be uploaded to the disclosed clinical data workflow engine cloud-based application. For example, an air conditioning system may incorporate edge IoT device 1205 and communicate that a compressor for that air conditioning system has been replaced or updated.

FIG. 12 also illustrates that customer network 1202 includes local compute resources 1206A-C that may include a server, access point, router, or other device configured to provide for local computational resources and/or facilitate communication amongst networks and devices. For example, local compute resources 1206A-C may be one or more physical local hardware devices. Local compute resources 1206A-C may also facilitate communication between other external applications, data sources (e.g., 1207A and 1207B), and services, and customer network 1202.

Network infrastructure 1200 also includes cellular network 1203 for use with mobile communication devices. Mobile cellular networks support mobile phones and many other types of mobile devices such as laptops etc. Mobile devices in network infrastructure 1200 are illustrated as mobile phone 1204D, laptop computer 1204E, and tablet computer 1204C. A mobile device such as mobile phone 1204D may interact with one or more mobile provider networks as the mobile device moves, typically interacting with a plurality of mobile network towers 1220, 1230, and 1240 for connecting to the cellular network 1203.

FIG. 12 illustrates that customer network 1202 is coupled to a network 1208. Network 1208 may include one or more computing networks available today, such as other LANs, wide area networks ("WAN"), the Internet, and/or other remote networks, in order to transfer data between client devices 1204A-D and cloud service provider network 1210 (e.g., a cloud service provider hosting the disclosed clinical data workflow engine application). Each of the computing networks within network 1208 may contain wired and/or wireless programmable devices that operate in the electrical and/or optical domain.

In FIG. 12, cloud service provider network 1210 is illustrated as a remote network (e.g., a cloud network) that is able to communicate with client devices 1204A-E via customer network 1202 and network 1208. The cloud service provider network 1210 acts as a platform that provides additional computing resources to the client devices 1204A-E and/or customer network 1202. In one embodiment, cloud service provider network 1210 includes one or more data centers 1212 with one or more server instances 1214. Cloud service provider network 1210 may also include one or more frames or clusters (and cluster groups) representing a scalable compute resource that may implement the techniques of this disclosure.

Figure 13:
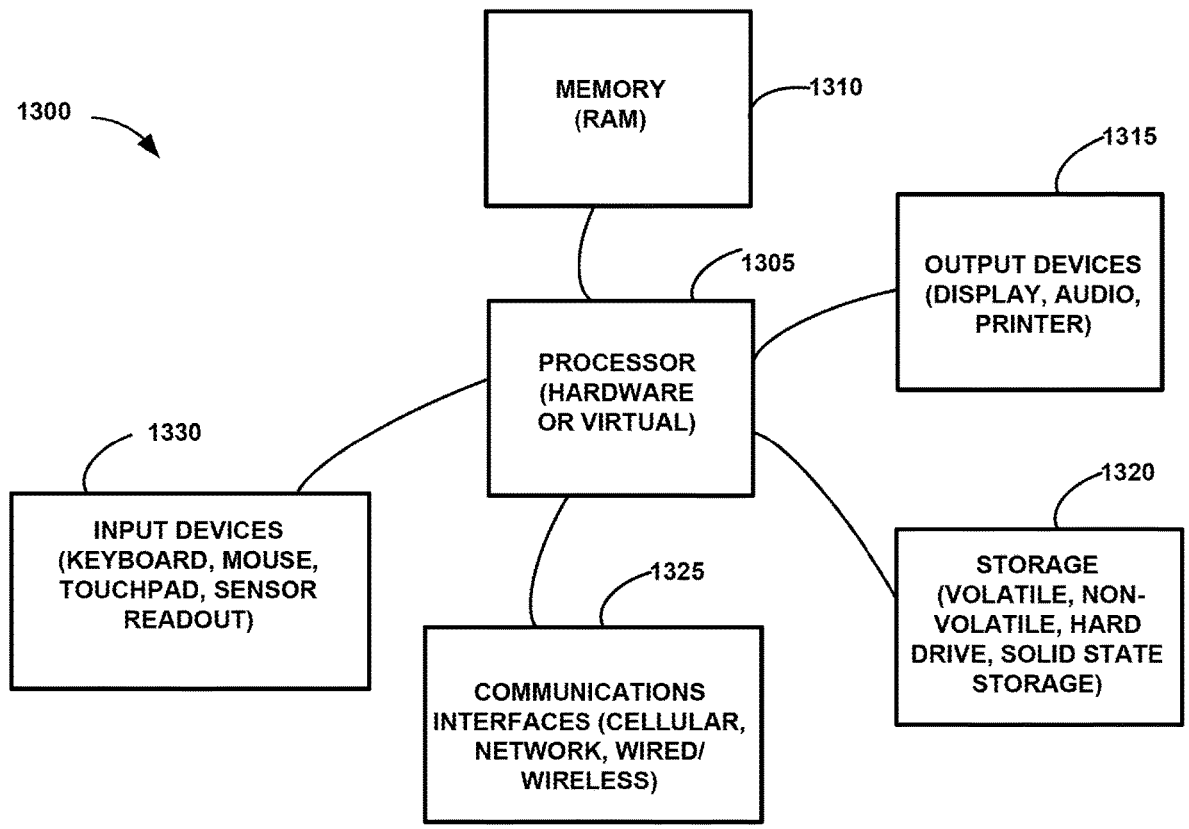
FIG. 13 is an example computer processor system as shown in a functional block diagram.

FIG. 13 illustrates a computing device 1300 that may be used to implement or be used with the functions, modules, processing platforms, execution platforms, communication devices, and other methods and processes of this disclosure. For example, computing device 1300 illustrated in FIG. 13 could represent a client device or a physical server device and include either hardware or virtual processor(s) depending on the level of abstraction of the computing device. In some instances (without abstraction), computing device 1300 and its elements, as shown in FIG. 13, each relate to physical hardware. Alternatively, in some instances one, more, or all of the elements could be implemented using emulators or virtual machines as levels of abstraction. In any case, no matter how many levels of abstraction away from the physical hardware, computing device 1300 at its lowest level may be implemented on physical hardware.

As also shown in FIG. 13, computing device 1300 may include one or more input devices 1330, such as a keyboard, mouse, touchpad, or sensor readout (e.g., biometric scanner) and one or more output devices 1315, such as displays, speakers for audio, or printers. Some devices may be configured as input/output devices also (e.g., a network interface or touchscreen display).

Computing device 1300 may also include communications interfaces 1325, such as a network communication unit that could include a wired communication component and/or a wireless communications component, which may be communicatively coupled to processor 1305. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication ("PLC"), WIFI®, cellular, and/or other communication methods.

As illustrated in FIG. 13, computing device 1300 includes a processing element such as processor 1305 that contains one or more hardware processors, where each hardware processor may have a single or multiple processor cores. As mentioned above, each of the multiple processor cores may be paired with a NVMe queue pair to facilitate implementations of this disclosure. In one embodiment, the processor 1305 may include at least one shared cache that stores data (e.g., computing instructions) that are utilized by one or more other components of processor 1305. For example, the shared cache may be a locally cached data stored in a memory for faster access by components of the processing elements that make up processor 1305.

In one or more embodiments, the shared cache may include one or more mid-level caches, such as level 2 ("L2"), level 3 ("L3"), level 4 ("L4"), or other levels of cache, a last level cache ("LLC"), or combinations thereof. Examples of processors include but are not limited to a central processing unit ("CPU") a microprocessor. Although not illustrated in FIG. 13, the processing elements that make up processor 1305 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 13 illustrates that memory 1310 may be operatively and communicatively coupled to processor 1305. Memory 1310 may be a non-transitory medium configured to store various types of data. For example, memory 1310 may include one or more storage devices 1320 that comprise a non-volatile storage device and/or volatile memory. Volatile memory, such as random-access memory ("RAM"), can be any suitable non-permanent storage device. The non-volatile storage devices 1320 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 1320 may be used to store overflow data if allocated RAM is not large enough to hold all working data. The non-volatile storage devices 1320 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1305. In one embodiment, the compiling process of the software program may transform program code written in a programming language to another computer language such that the processor 1305 is able to execute the programming code. For example, the compiling process of the software program may generate an executable program that provides encoded instructions (e.g., machine code instructions) for processor 1305 to accomplish specific, non-generic, particular computing functions.

After the compiling process, the encoded instructions may then be loaded as computer executable instructions or process steps to processor 1305 from storage device 1320, from memory 1310, and/or embedded within processor 1305 (e.g., via a cache or on-board ROM). Processor 1305 may be configured to execute the stored instructions or process steps in order to perform instructions or process steps to transform the computing device into a non-generic, particular, specially programmed machine or apparatus. Stored data, e.g., data stored by a storage device 1320, may be accessed by processor 1305 during the execution of computer executable instructions or process steps to instruct one or more components within the computing device 1300.

A user interface (e.g., output devices 1315 and input devices 1330) can include a display, positional input device (such as a mouse, touchpad, touchscreen, or the like), keyboard, or other forms of user input and output devices. The user interface components may be communicatively coupled to processor 1305. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 1300 may comprise other components well known in the art, such as sensors, powers sources, and/or analog-to-digital converters, not explicitly shown in FIG. 13.

FIGS. 14-18 provide additional information regarding technology and capability that may be incorporated into different implementations of the hierarchically distributed clinical data workflow engine. As explained throughout this disclosure, integration points are provided to collectively obtain and manage data that may be originally obtained in a plurality of different formats, data standards, communication protocols or the like. Adapters, converters, and interfaces may allow for a comprehensive management of the data discussed herein.

Figure 14:
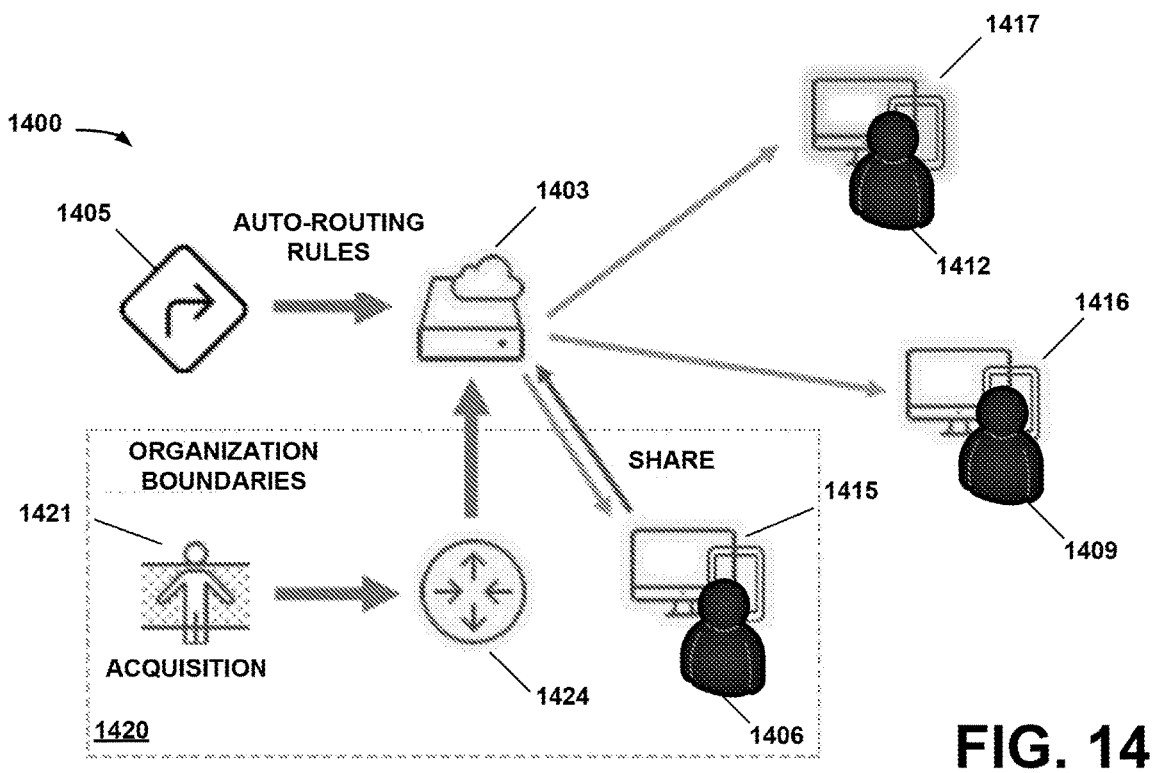
FIG. 14 illustrates one particular end use for the workflow disclosed relative to FIGS. 1-13.

FIG. 14 illustrates one particular end use for the workflow disclosed above. In the scenario 1400 depicted in FIG. 14, various users share patient health information through a medical information sharing platform 1403. The medical information sharing platform 1403 is a computing apparatus such as is described above on which all or part of the disclosed workflow engine is implemented. The "auto-routing rules" 1405 are a characterization of the operation of the workflow engine described above.

Each of three different users, the onsite organization user 1406, the offsite organization user 1409, and the external user 1412 views medical information on a respective medical information viewing platform 1415, 1416, 1417. The medical information viewing platforms 1415, 1416, 1417 are cloud-based medical image management and viewing solutions. This solution combines the power, utility and storage capacity inherent in cloud technology with the security, efficiency at real-time speed. Image files are saved in redundant repositories residing on the Microsoft Azure Cloud and are easily accessible.

References to "on-site" and "off-site" are relative to the site 1420 at which the medical information—e.g., medical images—is acquired from the patient 1421. The medical information is then transmitted to the medical information sharing platform 1403 using a communications tool 1424. The communications tool 1424 facilitates medical information transfers, including images, between healthcare facilities, device manufacturers, and other stakeholders without massive servers and resource allocation. The communications tool 1424 does so using the latest encryption and Health Insurance Portability and Accountability Act of 1996 ("HIPAA") high-tech transfer technology to move data up to the medical information sharing platform 1403 in Microsoft Azure.

Thus, in the scenario 1400 provides easier access to view and manage captured images on any device from anywhere. The scenario combines the power, utility and storage capacity inherent in cloud technology with the security, efficiency at real-time speed. Image files and other medical information are saved in redundant repositories residing on the Microsoft Azure Cloud and are easily accessible. The technology seamlessly collects images of other medical information from medical digital devices. Seamlessly, in this context, means entirely in the background and beyond the perception of the various users of the system. Images and other medical information are available for immediate viewing while securing them to the cloud. From there the medical information can be accessed by anyone authorized in the medical practice, clinic, imaging center, supplier, or hospital. Device manufacturers and other healthcare stakeholders can use this solution to acquire images for evaluation, planning and custom-designed implants.

The technique disclosed herein provides image access share technology that improves referrals, trauma transfers and second opinion collaborations by quickly, efficiently, and securely facilitating image access exchange anytime from anywhere using Cloud technology without unsecure compact disk ("CD") burning. The disclosed technology furthermore provides a highly secure, hybrid cloud-based FHIR platform (among others) that permits the secure exchange of images and patient data across organizations, desktops, and mobile devices. The disclosed technique furthermore connects healthcare facilities, providers, and patients with quick, convenient, cost-effective, and secure sharing of medical images and diagnostic reports anytime and anywhere.

Figure 15:
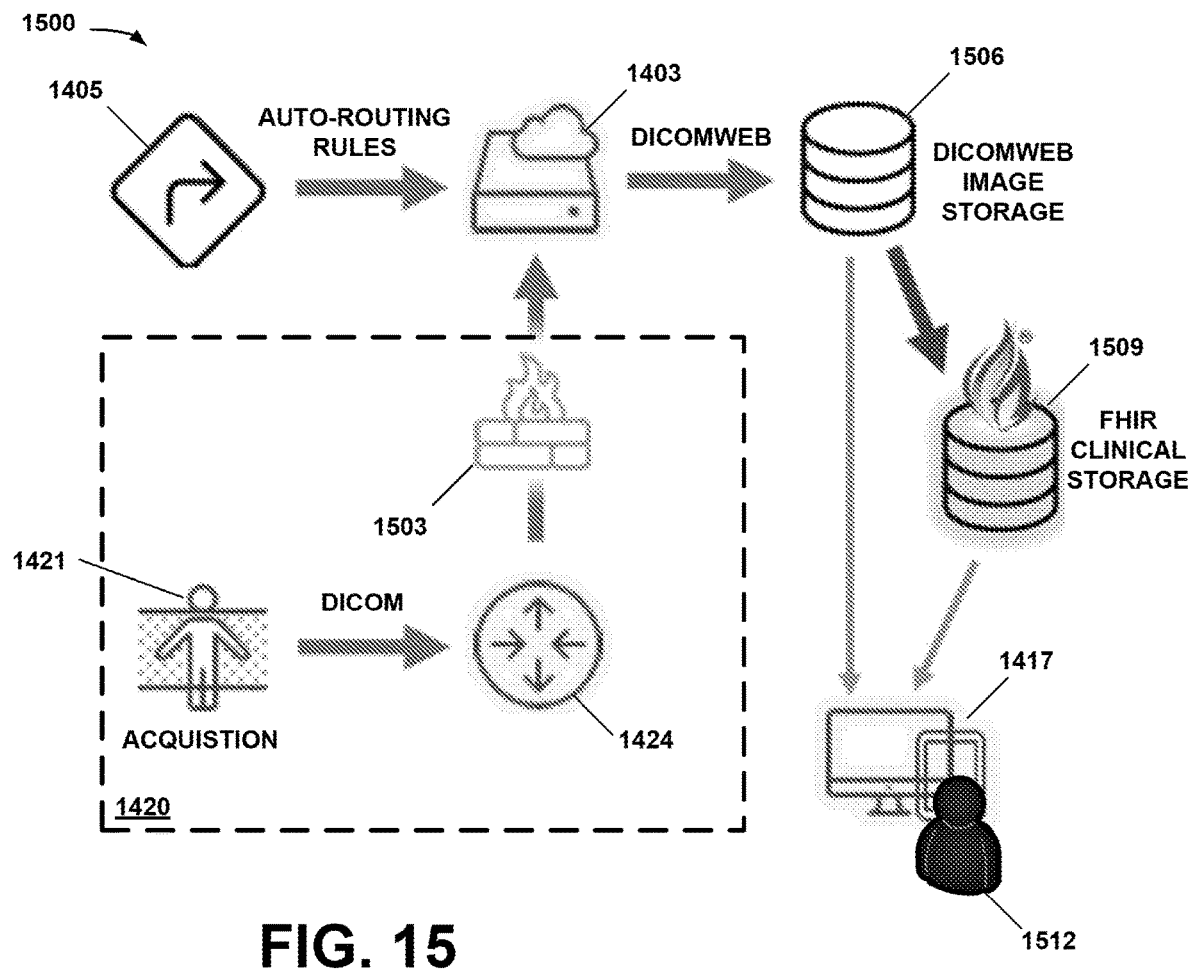
FIG. 15 presents a scenario in which a cloud-based computing system on which the presently disclosed technique includes DICOM storage using DICOMWeb.

FIG. 15 presents a scenario 1500 in which a cloud-based computing system on which the presently disclosed technique includes DICOM storage using DICOMWeb. DICOM is a standard for communicating and managing medical imaging information and related data, including storing and transmitting medical images. DICOMWeb is the DICOM standard for web-based imaging. The scenario 1500 shares some common elements with the scenario 1400 of FIG. 14 and like parts bear like numbers.

In the scenario 1500, the medical information is acquired from the patient 1424 at the site 1420. The medical information is imagery in this scenario that is formatted in DICOM and transmitted through the communications tool 1424 and the organization's firewall 1503 to the medical information sharing platform 1403 using DICOMWeb. Using the workflow engine disclosed above, the medical information is transmitted, again using DICOMWeb to a DICOMWeb image storage 1506, from whence it may be transferred to FHIR clinical storage 1509. The user can then retrieve or automatically receive and review medical information from both the DICOMWeb image storage 1506 and the FHIR clinical storage 1509.

Thus, in the scenario 1500, the disclosed technique allows sharing of images and FHIR records within and across organizations, either triggered by automatic routing rules or per user request. The DICOMWeb image storage 1506 automatically scans the image metadata and converts it into FHIR records consumable by the medical information viewing platform 1415 and other FHIR-compliant applications. Technical features in this scenario include Azure Structured Query Language ("SQL") and Blob storage, encryption-at-rest, secured transport layer, scalable capacity, and per-organization isolation.

Figure 16:
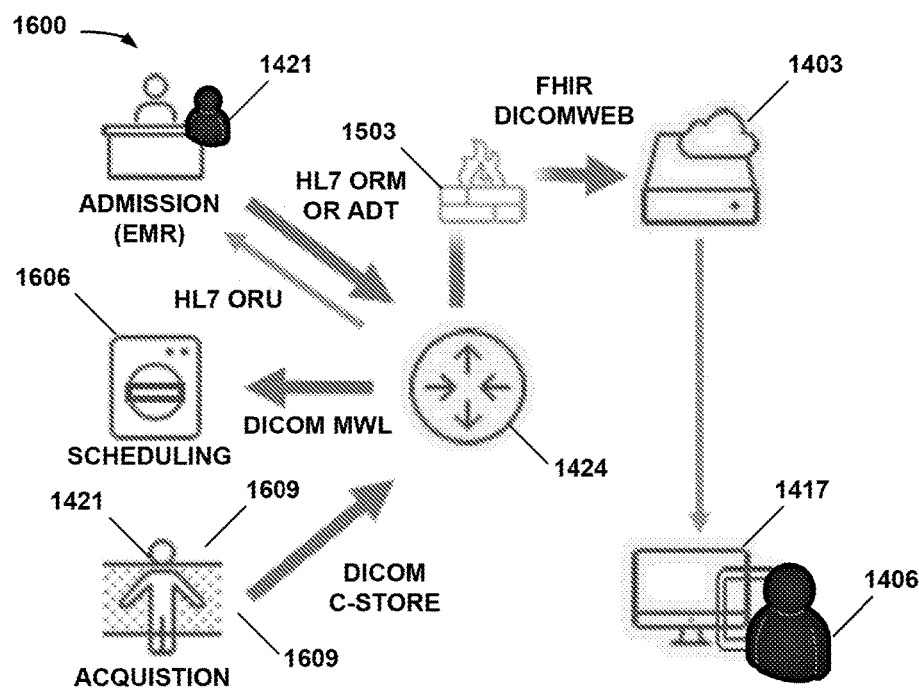
FIG. 16 depicts a scenario illustrating how the presently disclosed technique may be integrated into patient treatment flows in one particular embodiment.

FIG. 16 depicts a scenario 1600 illustrating how the presently disclosed technique may be integrated into patient treatment flows in one particular embodiment. Again, the scenario 1600 shares some common elements with the scenario 1400 of FIG. 14 and like parts bear like numbers. More particularly, in the scenario 1600 the workflow engine acts as a translator for several entities communicating in different healthcare IT protocols, and upload images to the cloud without conflicting with network firewalls. This scenario 1600 employs at least DICOM, DICOMWeb HL7 2.x, HL7 FHIR R4.

The scenario 1600 begins when the patient 1424 is admitted at 1603 and an electronic medical record is created or retrieved. The EMR system sends an HL7 message to the communications tool 1424. The modality operator picks an order from the modality worklist and sends it to scheduling at 1606 using DICOM MWL. The acquisition is then performed at 1609 and the acquired images sent to the communications tool 1424 using DICOM-C store. The communications tool 1424 sends the acquired images back to the EMR using HL7 ORU. The EMR then sends the acquired images through the firewall 1503 to the cloud repository (not shown) using FHIR and DICOMWeb protocols. The images are then visible anywhere by using the medical information viewing platform 1406 directly or from the EMR.

Figure 17:
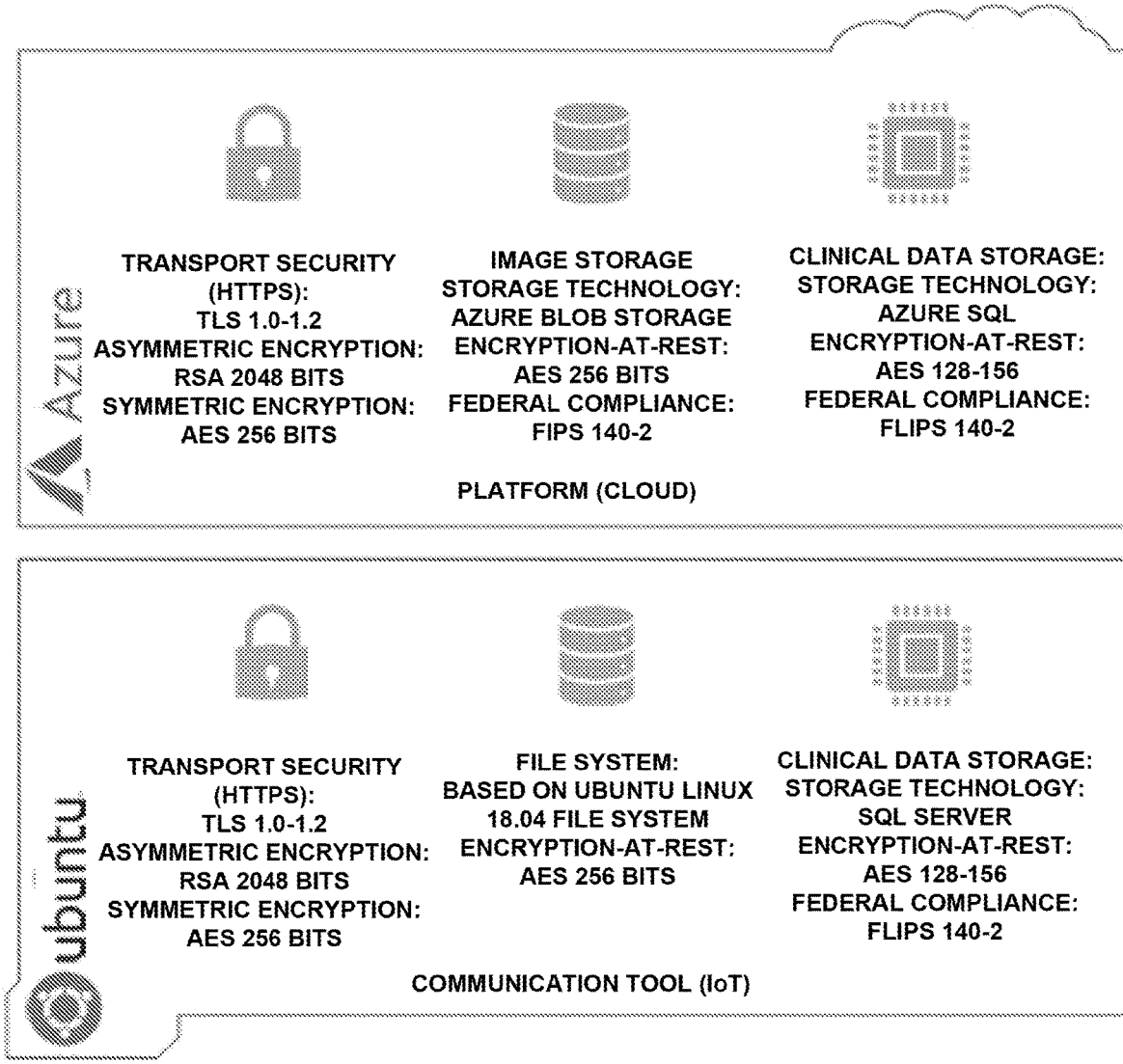
FIG. 17 illustrates selected technical aspects of one embodiment pertaining to security and integrity.

FIG. 17 illustrates selected technical aspects of one embodiment pertaining to security and integrity. The drawing references Microsoft's Azure mentioned above and sets forth a number of selected security and integrity features available for those portions of the computing system—e.g., the various platforms-implemented on the cloud. The drawing also references Ubuntu, which is a free and (mostly) open-source Linux-based operating system used for cloud computing and IoT applications, among other things. The drawing also references selected security and integrity features available on the IoT implementations from the use of Ubuntu. The embodiments illustrated herein leverage these security features from Azure and Ubuntu. Alternative embodiments may employ alternatives to Azure and Ubuntu taking into consideration security and integrity features.

Various selected platform security features in the illustrated embodiments may be classed as pertaining to access, isolation, and sharing. Access security features include limitations that users may log into only a single organization's computing system at a time and that general access is token-based through Hypertext Transfer Protocol Secure ("HTTPS"). Platform security features with respect to isolation include limitations that (1) all clinical (e.g., FHIR) and imaging (e.g., DICOM) data is segmented and isolated in the cloud per organization, and (2) the platform gateway only passes data related to the logged organization. Security features pertaining to sharing of medical information include isolation exception(s) for the shared data authorized vie FHIR consent record and records from other organizations cannot be seen or downloaded to the logged organization until the logged organization consents and accepts the download. Not all these security features must necessarily be used in all embodiments and alternative embodiments may use other security features in addition to, or in lieu of, those set forth herein.

Figure 18A:
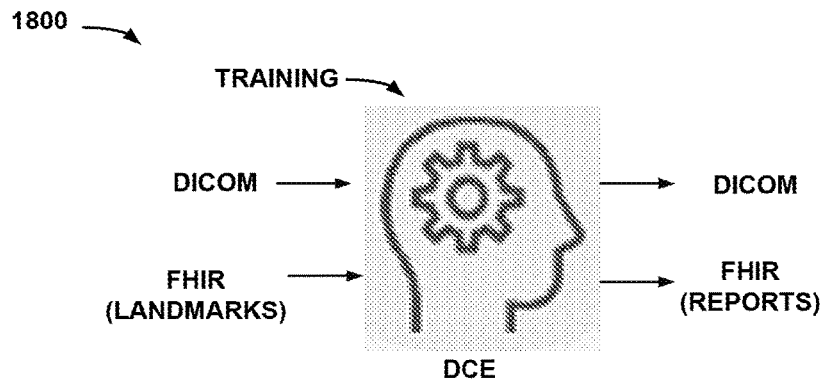
FIG. 18a-FIG. 18c illustrate how the presently disclosed technique may be deployed with artificial intelligence ("AI").
Figure 18B:
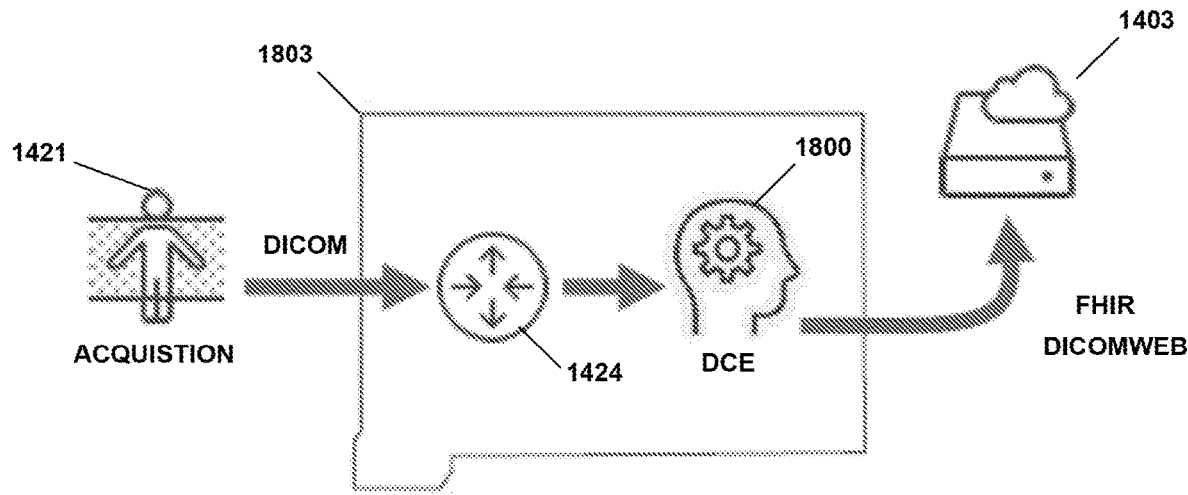
Figure 18C:
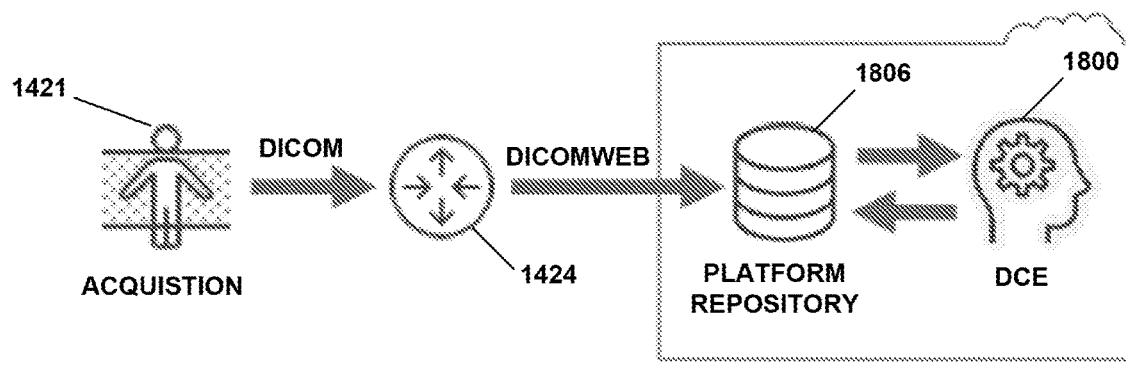

FIG. 18a-FIG. 18c illustrate how the presently disclosed technique may be deployed with artificial intelligence ("AI"). Again, some parts of the systems shown in FIG. 18a-FIG. 18c share some common elements with the scenario 1400 of FIG. 14 and like parts bear like numbers. FIG. 18A conceptually illustrates a DICOM Compute Engine ("DCE") 1800, a form of artificial intelligence, as well as some inputs and outputs. The presently disclosed techniques compatibility with DICOM, FHIR, and DICOMWeb standards facilitates the installation of a DCE 1800 on a medical information sharing platform 1403 or, as shown in FIG. 18B, an organization's computing system 1803. Alternatively, or additionally, the DCE 1800 may be installed externally to the organization's computing system to perform certain functions on medical information data in a platform repository 1806.

Applications for the DCE 1800 in some embodiments may include image quality check, image calibration, anatomical landmarking, segmentation, and automated reporting. Those in the art having the benefit of this disclosure may appreciate still other tasks for which an artificial intelligence such as the DCE 1800 may be employed or locations where it may be installed relative to the presently disclosed technique. Furthermore, those in the art having the benefit of this disclosure may appreciate other artificial intelligences that may have applicability in lieu of the DCE 1800.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

The phrase "capable of" as used herein is a recognition of the fact that some functions described for the various parts of the disclosed apparatus are performed only when the apparatus is powered and/or in operation. Thus, at times, some embodiments of the apparatus of the invention are "capable of" performing the recited functions even when they are not actually performing them—e.g., when they are not in operation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
receiving, by one or more processors and from a first medical device, a first plurality of medical data objects in a first plurality of varying medical data formats and a first plurality of disparate medical protocols;
reading, by the one or more processors, configuration parameters of a workflow,
wherein the workflow includes transactions, activity elements and queue elements,
wherein each of the transactions comprises execution of one or more workflow elements with or on other workflow elements;
determining, by the one or more processors, the workflow by the configuration parameters specific to an activity instance and at least one of activities and,
grouping the activity elements and the queue elements as the transactions;
passing, by the one or more processors and as part of the workflow, the first plurality of medical data objects between the activities in random access memory, without using other temporary mass storage, wherein the activities include an input activity, a processing activity, a flow activity and an output activity;
storing, using the queue elements, the first plurality of medical data objects in a queue until the first plurality of medical data objects are needed by the activity elements;
removing, using the queue elements, expired medical data objects of the first plurality of medical data objects from the queue;
dequeuing, using the queue elements, the first plurality of medical data objects from the queue, in response to a request from a second medical device;
transforming, by the one or more processors, using the workflow and the activity elements, each received medical data object into one of a second plurality of varying medical data formats; and
transmitting, by the one or more processors, the transformed medical data objects in the second plurality of varying medical data formats using a second plurality of disparate medical protocols with the second medical device, in response to the request from the second medical device.

2. The method of claim 1, wherein at least one of the first plurality of varying medical data formats and first plurality of disparate medical protocols and the second plurality of varying medical data formats and second plurality of disparate medical protocols includes at least:
HL7 v2—all message types;
HL7 v3—all message types;
HL7 FHIR R4—all resource types;
HL7 FHIR R5—all resource types;
HL7 CDA R2—all document types;
DICOM (DIMSE)—all services; and
DICOM (DICOMweb)—all services.

3. The method of claim 1, wherein the first plurality of varying medical data formats and first plurality of disparate medical protocols and the second plurality of varying medical data formats and second plurality of disparate medical protocols are co-extensive.

4. The method of claim 1, wherein the workflow at least one of:
is based exclusively on Activities and Queue elements;
does not require persisting activity states;
is a directed acyclic graph; or
is recoverable by reprocessing pending Queue elements.

5. The method of claim 1, wherein the workflow engine is based on a closed taxonomy of activities for handling medical data, comprising six base types:
input from network;
input from queue;
data processing;
flow control;
output to queue; and
output to network.

6. The method of claim 1, further comprising dynamically configuring the workflow via an IoT configuration service as a set of discrete activity elements and a set of parameters for each activity element, the parameters being retrieved from the IoT configuration service, and without reprogramming any software component.

7. The method of claim 1, further comprising executing, by the one or more processors, the transactions in parallel because the activity elements are stateless and reentrant.

8. A computer system, comprising:
one or more processors; and
one or more tangible, non-transitory memories configured to communicate with the one or more processors,
the one or more tangible, non-transitory memories and instructions stored thereon that, in response to execution by the one or more processors, cause the one or more processors to perform operations comprising:
receiving, by the one or more processors and from a first medical device, a first plurality of medical data objects in a first plurality of varying medical data formats and a first plurality of disparate medical protocols;
reading, by the one or more processors, configuration parameters of a workflow,
wherein the workflow includes transactions, activity elements and queue elements,
wherein each of the transactions comprises execution of one or more workflow elements with or on other workflow elements;
determining, by the one or more processors, the workflow by the configuration parameters specific to an activity instance and at least one of activities and,
grouping the activity elements and the queue elements as the transactions;
passing, by the one or more processors and as part of the workflow, the first plurality of medical data objects between the activities in random access memory, without using other temporary mass storage, wherein the activities include an input activity, a processing activity, a flow activity and an output activity;
storing, using the queue elements, the first plurality of medical data objects in a queue until the first plurality of medical data objects are needed by the activity elements;
removing, using the queue elements, expired medical data objects of the first plurality of medical data objects from the queue;
dequeuing, using the queue elements, the first plurality of medical data objects from the queue, in response to a request from a second medical device;
transforming, by the one or more processors, using the workflow and the activity elements, each received medical data object into one of a second plurality of varying medical data formats; and
transmitting, by the one or more processors, the transformed medical data objects in the second plurality of varying medical data formats using a second plurality of disparate medical protocols with the second medical device, in response to the request from the second medical device.

9. The computer system of claim 8, wherein at least one of the first plurality of varying medical data formats and first plurality of disparate medical protocols and the second plurality of varying medical data formats and second plurality of disparate medical protocols includes at least:
HL7 v2—all message types;
HL7 v3—all message types;
HL7 FHIR R4—all resource types;
HL7 FHIR R5—all resource types;
HL7 CDA R2—all document types;
DICOM (DIMSE)—all services; and
DICOM (DICOMweb)—all services.

10. The computer system of claim 8, wherein the first plurality of varying medical data formats and first plurality of disparate medical protocols and the second plurality of varying medical data formats and second plurality of disparate medical protocols are co-extensive.

11. The computer system of claim 8, wherein the workflow at least one of:
is based exclusively on Activities and Queue elements;
does not require persisting activity states;
is a directed acyclic graph; or
is recoverable by reprocessing pending Queue elements.

12. The computer system of claim 8, wherein the workflow is based on a closed taxonomy of activities for handling medical data, comprising six base types:
input from network;
input from queue;
data processing;
flow control;
output to queue; and
output to network.

13. The computer system of claim 8, wherein the workflow engine is dynamically configured via an IoT configuration service as a set of discrete activity elements and a set of parameters for each activity element, the parameters being retrieved from the IoT configuration service, and without reprogramming any software component.

14. The computer system of claim 8, wherein the workflow engine is further configured to report its status as accumulation of status of processing queues via an IoT reporting service.

15. An article of manufacture including one or more non-transitory, tangible computer readable storage mediums and instructions stored thereon that, in response to execution by one or more processors, cause the one or more processors to perform operations comprising:
receiving, by the one or more processors and from a first medical device, a first plurality of medical data objects in a first plurality of varying medical data formats and a first plurality of disparate medical protocols;
reading, by the one or more processors, configuration parameters of a workflow, wherein the workflow includes transactions, activity elements and queue elements,
wherein each of the transactions comprises execution of one or more workflow elements with or on other workflow elements;
determining, by the one or more processors, the workflow by the configuration parameters specific to an activity instance and at least one of activities and,
grouping the activity elements and the queue elements as the transactions;
passing, by the one or more processors and as part of the workflow, the first plurality of medical data objects between the activities in random access memory, without using other temporary mass storage, wherein the activities include an input activity, a processing activity, a flow activity and an output activity;
storing, using the queue elements, the first plurality of medical data objects in a queue until the first plurality of medical data objects are needed by the activity elements;
removing, using the queue elements, expired medical data objects of the first plurality of medical data objects from the queue;
dequeuing, using the queue elements, the first plurality of medical data objects from the queue, in response to a request from a second medical device;
transforming, by the one or more processors, using the workflow and the activity elements, each received medical data object into one of a second plurality of varying medical data formats; and
transmitting, by the one or more processors, the transformed medical data objects in the second plurality of varying medical data formats using a second plurality of disparate medical protocols with the second medical device, in response to the request from the second medical device.

16. The article of claim 15, wherein at least one of the first plurality of varying medical data formats and first plurality of disparate medical protocols and the second plurality of varying medical data formats and second plurality of disparate medical protocols includes at least:
HL7 v2—all message types;
HL7 v3—all message types;
HL7 FHIR R4—all resource types;
HL7 FHIR R5—all resource types;
HL7 CDA R2—all document types;
DICOM (DIMSE)—all services; and
DICOM (DICOMweb)—all services.

17. The article of claim 15, wherein the first plurality of varying medical data formats and first plurality of disparate medical protocols and the second plurality of varying medical data formats and second plurality of disparate medical protocols are co-extensive.

18. The article of claim 15, wherein the workflow at least one of engine:
is based exclusively on Activities and Queue elements;
does not require persisting activity states;
is a directed acyclic graph; or
is recoverable by reprocessing pending Queue elements.

19. The article of claim 15, wherein the workflow engine is based on a closed taxonomy of activities for handling medical data, comprising six base types:
input from network;
input from queue;
data processing;
flow control;
output to queue; and
output to network.

20. The article of claim 15, further comprising dynamically configuring the workflow via an IoT configuration service as a set of discrete activity elements and a set of parameters for each activity element, the parameters being retrieved from the IoT configuration service, and without reprogramming any software component.

21. The article of claim 15, further comprising the workflow reporting its status as accumulation of status of processing queues via an IoT reporting service.

22. The article of claim 15, wherein the one or more processors is distributed across a computing system.

23. The method of claim 1, further comprising re-executing the transactions starting from the last queue containing the first plurality of medical data objects, in response to the transactions being interrupted.

24. The method of claim 1, wherein the workflow comprises a plurality of input activities, at least two input activities from the plurality of the input activities share a single HTTP endpoint or a single TCP/IP port for receiving medical data objects through the first plurality of disparate medical protocols, each input activity from the plurality of input activities associated with a different Uniform Resource Locator (URL) path.

* * * * *